United States Patent
Kim et al.

(10) Patent No.: US 10,075,991 B2
(45) Date of Patent: *Sep. 11, 2018

(54) METHOD AND APPARATUS FOR PERFORMING STATE TRANSITION FOR DEVICE-TO-DEVICE COMMUNICATION

(71) Applicant: Samsung Electronics Co., Ltd., Suwon-si (KR)

(72) Inventors: Kyung-Kyu Kim, Suwon-si (KR); Young-Bin Chang, Anyang-si (KR); Seung-Hoon Park, Seoul (KR); Sang-Kyu Baek, Suwon-si (KR); Sung-Jin Lee, Bucheon-si (KR)

(73) Assignee: Samsung Electronics Co., Ltd. (KR)

( * ) Notice: Subject to any disclaimer, the term of this patent is extended or adjusted under 35 U.S.C. 154(b) by 133 days.

This patent is subject to a terminal disclaimer.

(21) Appl. No.: 14/781,773

(22) PCT Filed: Apr. 1, 2014

(86) PCT No.: PCT/KR2014/002776
§ 371 (c)(1),
(2) Date: Oct. 1, 2015

(87) PCT Pub. No.: WO2014/163372
PCT Pub. Date: Oct. 9, 2014

(65) Prior Publication Data
US 2016/0057795 A1   Feb. 25, 2016

(30) Foreign Application Priority Data
Apr. 1, 2013  (KR) .................. 10-2013-0035241

(51) Int. Cl.
*H04W 4/00*   (2018.01)
*H04W 76/14*  (2018.01)
(Continued)

(52) U.S. Cl.
CPC .......... *H04W 76/14* (2018.02); *H04W 8/005* (2013.01); *H04W 76/27* (2018.02); *H04W 88/06* (2013.01); *H04W 88/08* (2013.01)

(58) Field of Classification Search
CPC .................................................. H04W 76/046
(Continued)

(56) References Cited

U.S. PATENT DOCUMENTS 8,988,807 B1    3/2015  Schmidt
9,629,178 B2 *  4/2017  Lee ...................... H04W 76/14
(Continued)

FOREIGN PATENT DOCUMENTS

CN    102090132 A    6/2011
CN    102334370 A    1/2012
(Continued)

OTHER PUBLICATIONS

Communication with Supplementary European Search Report dated Oct. 20, 2016 corresponding to European Application No. EP 14779441.6.
(Continued)

*Primary Examiner* — Asad Nawaz
*Assistant Examiner* — Berhanu Belete
(74) *Attorney, Agent, or Firm* — McAndrews, Held & Malloy, Ltd.

(57) ABSTRACT

A method and apparatus for performing a state transition for Device to Device (D2D) communication are provided. The method includes determining whether D2D initiation is required, while a terminal is operating in a first or a second state defined by EPS (Enhanced Packet System) Mobility Management (EMM)-Deregistered and EPS Connection Management (ECM)-IDLE at a Non-Access Stratum (NAS) layer and Radio Resource Control (RRC)-IDLE. If the D2D initiation is required, the method includes transitioning to a
(Continued)

third state defined by EMM-Registered and ECM/RRC-Connected and performing the D2D initiation through a mobile communication network. If a deactivation condition is satisfied or a D2D state update is completed in the third state, the method includes transitioning to a fourth state defined by EMM-Registered and ECM/RRC-IDLE, and if a state update or scheduling for D2D communication is required in the fourth state, the method includes transitioning to the third state.

19 Claims, 20 Drawing Sheets

(51) Int. Cl.
*H04W 76/27* (2018.01)
*H04W 8/00* (2009.01)
*H04W 88/06* (2009.01)
*H04W 88/08* (2009.01)

(58) Field of Classification Search
USPC ............ 370/206; 455/127.5, 3.05, 416, 41.2, 455/502, 517, 519, 90.2
See application file for complete search history.

(56) References Cited

U.S. PATENT DOCUMENTS

| | | | |
|---|---|---|---|
| 9,648,638 B2* | 5/2017 | Lee | H04W 76/14 |
| 2005/0239451 A1 | 10/2005 | Periyalwar et al. | |
| 2009/0017857 A1* | 1/2009 | Kwon | H04W 76/046 |
| | | | 455/519 |
| 2010/0260101 A1 | 10/2010 | Tsirtsis et al. | |
| 2011/0019532 A1* | 1/2011 | Jung | H04W 76/028 |
| | | | 370/216 |
| 2011/0081908 A1 | 4/2011 | Michaelis et al. | |
| 2011/0106952 A1 | 5/2011 | Doppler et al. | |
| 2012/0106517 A1 | 5/2012 | Charbit et al. | |
| 2012/0184306 A1 | 7/2012 | Zou et al. | |
| 2013/0039244 A1* | 2/2013 | Sun | H04W 52/0235 |
| | | | 370/311 |
| 2013/0065522 A1 | 3/2013 | Hwang et al. | |
| 2014/0023008 A1 | 1/2014 | Ahn et al. | |
| 2014/0038590 A1* | 2/2014 | Wijting | H04W 76/023 |
| | | | 455/426.1 |
| 2014/0128092 A1 | 5/2014 | Xiong et al. | |
| 2014/0370915 A1* | 12/2014 | Jung | H04W 64/00 |
| | | | 455/456.1 |
| 2015/0063095 A1* | 3/2015 | Deng | H04W 76/18 |
| | | | 370/221 |
| 2015/0124735 A1* | 5/2015 | Cho | H04W 72/042 |
| | | | 370/329 |
| 2015/0208452 A1* | 7/2015 | Lee | H04W 76/14 |
| | | | 455/426.1 |
| 2015/0351020 A1* | 12/2015 | Lin | H04W 8/005 |
| | | | 455/404.1 |
| 2016/0014831 A1* | 1/2016 | Lee | H04W 76/14 |
| | | | 370/329 |
| 2016/0044488 A1* | 2/2016 | Kim | H04W 76/14 |
| | | | 370/328 |

FOREIGN PATENT DOCUMENTS

| | | |
|---|---|---|
| CN | 102550117 A | 7/2012 |
| CN | 102711105 A | 10/2012 |
| CN | 102883440 A | 1/2013 |
| JP | 2012-523757 | 10/2012 |
| KR | 10-0992419 | 11/2010 |
| KR | 10-2012-0070596 | 6/2012 |
| KR | 10-2012-0074254 | 7/2012 |
| KR | 10-2013-0027965 | 3/2013 |

OTHER PUBLICATIONS

International Search Report of PCT/KR2014/002776 dated Jul. 24, 2014.
Office Action dated Aug. 29, 2017 corresponding to U.S. Appl. No. 15/473,236.
Office Action dated Feb. 8, 2018 corresponding to Chinese Patent Application No. 201480031517.5.

* cited by examiner

METHOD AND APPARATUS FOR PERFORMING STATE TRANSITION FOR DEVICE-TO-DEVICE COMMUNICATION

PRIORITY

This application is a National Phase Entry of PCT International Application No. PCT/KR2014/002776 which was filed on Apr. 1, 2014, and claims a priority to Korean Patent Application No. 10-2013-0035241 which was filed on Apr. 1, 2013, the contents of which are incorporated herein by reference.

TECHNICAL FIELD

The present invention relates to Device to Device (D2D) communication, and more particularly, to a method and apparatus supporting a state transition of a device, for D2D communication in a wireless communication system.

BACKGROUND

D2D communication or Peer to Peer (P2P) communication is a communication service provided via a direct communication link established between terminals without intervention of a network entity such as a Base Station (BS) or an Access Point (AP).

A D2D device acquires device information and service information about at least one device by acquiring synchronization to devices around the D2D device and discovering devices at a predetermined time using predetermined resources. The device information may include identification information, interest information, and application information about the device.

D2D communication may be conducted in conjunction with a cellular mobile communication system, a wireless communication system, or a wideband communication system. A D2D device may search for neighbor devices at a time and resources set by a BS of a mobile communication system, in the same frequency band as allocated to the mobile communication system. The D2D device accesses a network and receives support such as authentication, security, and the like, for D2D communication.

If D2D communication is separated from mobile communication and conducted independently, the D2D device may operate in one of s D2D communication state. However, when the D2D communication states are independent of mobile communication states, interaction between D2D communication and mobile communication is impossible. Accordingly, unnecessary state switching may occur between D2D communication and mobile communication in the related art.

Technical Problem

An aspect of the present disclosure is to address at least the above-mentioned problems and/or disadvantages and to provide a method and apparatus for supporting Device to Device (D2D) communication states.

Another aspect of the present disclosure is to provide a method and apparatus for performing a state transition for interaction between D2D communication and mobile communication.

Another aspect of the present disclosure is to provide a method and apparatus for supporting a protocol stack and a state transition model for D2D communication interacting with wideband mobile communication.

Technical Solution

In an aspect of the present disclosure, there is provided a method for performing a state transition for D2D communication. The method includes determining whether D2D initiation is required, while a terminal is operating in a first or a second state defined by EPS (Enhanced Packet System) Mobility Management (EMM)-Deregistered and EPS Connection Management (ECM)-IDLE at a Non-Access Stratum (NAS) layer and Radio Resource Control (RRC)-IDLE. If the D2D initiation is required, the method also includes transitioning to a third state defined by EMM-Registered and ECM/RRC-Connected, and performing the D2D initiation through a mobile communication network. If a deactivation condition is satisfied or a D2D state update is completed in the third state, the method includes transitioning to a fourth state defined by EMM-Registered and ECM/RRC-IDLE, and if a state update or scheduling for D2D communication is required in the fourth state, the method includes transitioning to the third state.

In another aspect of the present disclosure, there is provided a method for performing a state transition for D2D communication. The method includes determining whether D2D initiation is required, while a terminal is operating in a first or second state defined by D2D-Disable in which D2D communication is not used, and if the D2D initiation is required, transitioning to a third state defined by ECM/RRC-Connected and D2D-Enable and performing the D2D initiation through a mobile communication network. Also, if a deactivation condition is satisfied or a D2D state update is completed in the third state, the method includes transitioning to a fourth state defined by ECM/RRC-IDLE and D2D-Enable, and if a state update or scheduling for D2D communication is required in the fourth state, the method includes transitioning to the third state.

In another aspect of the present disclosure, there is provided a method for performing a state transition for D2D communication. The method includes determining whether D2D initiation is required, while a terminal is operating in a D state defined by ECM-IDLE, RRC-IDLE, and D2D_RRC-IDLE, if the D2D initiation is required, transitioning to a C state defined by ECM-Connected, D2D_RRC-Connected, and RRC-IDLE and performing the D2D initiation through a mobile communication network. Upon generation of new traffic to be transmitted by mobile communication in the C state, the method includes transitioning to a B state defined by ECM-Connected, D2D_RRC-Connected, and RRC-Connected, and upon sensing D2D detachment in the B state, the method includes transitioning to an A state defined by ECM-Connected, RRC-Connected, and D2D_RRC-IDLE. And, if a deactivation condition for mobile communication is satisfied in the A state, the method includes transitioning to the D state.

In another aspect of the present disclosure, there is provided a method for performing a state transition for D2D communication. The method includes determining whether D2D initiation is required, while a terminal is operating in a B state defined by EMM-Deregistered, D2D_ECM-Disable, and RRC-Disable, if the D2D initiation is required, transitioning to a C state defined by EMM-Registered, D2D_ECM-Enable, and RRC-Enable and performing the D2D initiation, if D2D detachment is required in the C state, transitioning to a D state defined by EMM-Registered, D2D_ECM-Disable, and RRC-Disable, and upon generation of new traffic to be transmitted by D2D communication in the D state, transitioning to the C state and performing the D2D initiation again.

In another aspect of the present disclosure, there is provided an apparatus for performing a state transition for D2D communication. The apparatus includes a processor for performing functions of a NAS layer and a RRC layer that process control messages related to mobile communication and D2D communication, and a controller for controlling states of the NAS layer and the RRC layer. The controller determines whether D2D initiation is required, while a terminal is operating in a first or second state defined by EMM-Deregistered and ECM-IDLE at the NAS layer and RRC-IDLE, if the D2D initiation is required, transitions to a third state defined by EMM-Registered and ECM/RRC-Connected and performs the D2D initiation through a mobile communication network, if a deactivation condition is satisfied or a D2D state update is completed in the third state, transitions to a fourth state defined by EMM-Registered and ECM/RRC-IDLE, and if a state update or scheduling for D2D communication is required in the fourth state, transitions to the third state.

DETAILED DESCRIPTION

Preferred embodiments of the present disclosure will be described in detail with reference to the attached drawings. In addition, descriptions of well-known functions or constructions may be omitted lest they should obscure the subject matter of the present disclosure. The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

The present disclosure provides protocol stacks and state transition conditions for a User Equipment (UE) supporting Device to Device (D2D) communication in a cellular wideband mobile communication system. While the following description is given in the context of a Long Term Evolution (LTE) system as an exemplary wideband wireless access system, it is obvious that the present disclosure is applicable to all systems that require message transmission and reception between an access network and a UE.

Figure 1:
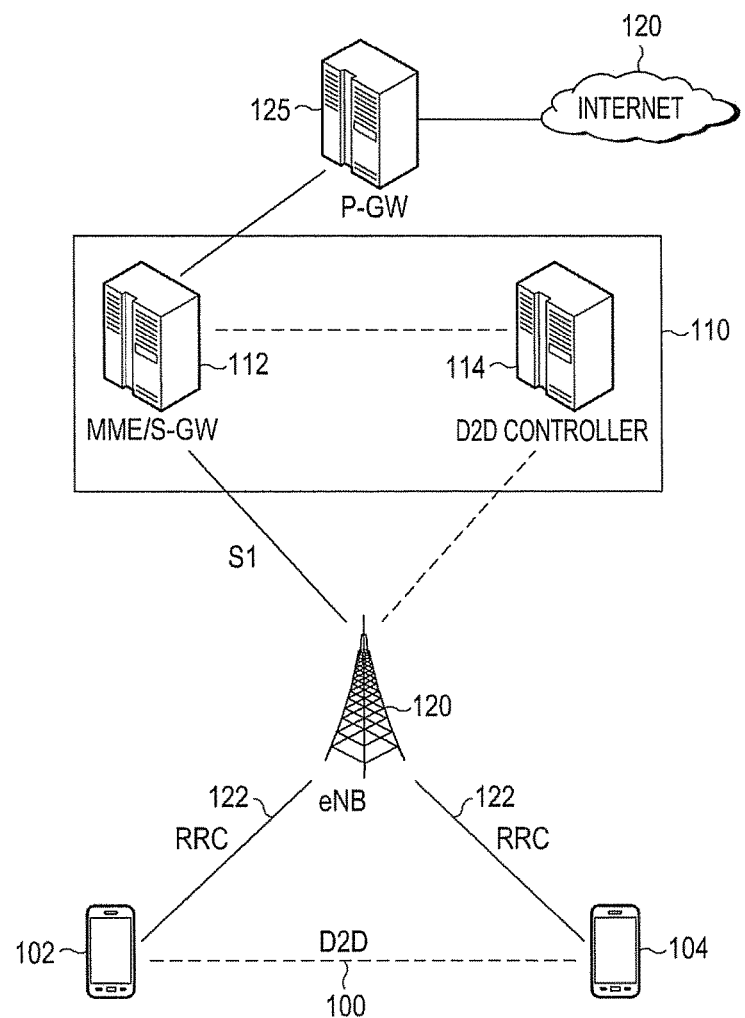
FIG. 1 illustrates a configuration of a wideband system supporting Device to Device (D2D) communication according to an embodiment of the present disclosure.

FIG. 1 illustrates a configuration of a wideband system supporting D2D communication according to an embodiment of the present disclosure.

Referring to FIG. 1, UEs 102 and 104 may be configured so as to establish a D2D interface 100 for D2D communication between the UEs 102 and 104. The UEs 102 and 104 may be located in a cell covered by the same evolved Node B (eNode B or eNB) 120 or cells covered by different eNBs. At least one of the UEs 102 and 104 may be connected to a core network 110 of the wideband system through the eNB 120 and receive D2D communication support from the core network 110.

The core network 110 includes a Mobility Management Entity (MME) 112 and a D2D controller 114 and provides a mobile communication service to the UEs 102 and 104 through the eNB 120. The eNB 120 may establish Radio Resource Control (RRC) interfaces 122 with the UEs 102 and 104 to exchange control signals with the UEs 102 and 104.

The D2D interface 100 between the UEs 102 and 104 defines end points of communication as the UEs 102 and 104 and is used to exchange control messages and/or data required for D2D communication between the UEs 102 and 104. At least one of the UEs 102 and 104 may have an RRC interface 122 to connect to the eNB 120 in addition to the D2D interface 100. The D2D interface 100 and the RRC interface 122 may operate independently or dependently.

The MME 112 may manage the mobility of the UEs 102 and 104 through the eNB 120 and may include a Serving GateWay (S-GW) function to control the mobile communication service for the UEs 102 and 104 depending on a system configuration. With the S-GW function of the MME 112, the MME 112 connects the UEs 102 and 104 to the Internet 120 through a Packet GateWay (P-GW) 125.

The D2D controller 114 controls and manages D2D communication for the UEs 102 and 104. The functions of the D2D controller 114 are largely divided into a provisioning function and a matching function. With the provisioning function, the D2D controller 114 acknowledges D2D communication for the UEs 102 and 104 under the support of the core network 110 and additionally provides security for secure communication, charging, and D2D control to the UEs 102 and 104. With the matching function, the D2D controller 114 supports discovery of another UE matching to the UEs 102 and 104 in terms of interest with the aid of the network in such a manner that computing and power consumption of a UE are minimized during D2D discovery. While the D2D controller 114 is shown in FIG. 1 as an independent entity, the D2D controller 114 may be a logical entity incorporated into another network entity, for example, the MME 112 in another embodiment of the present disclosure.

To conduct D2D communication, the UEs 102 and 104 supporting D2D communication (also referred to as the D2D UEs 102 and 104) may be controlled for authentication, security, and charging by the network and may request connection to the network, for discovery, when needed. On the other hand, control signals for D2D communication (hereinafter, referred to as D2D control signals) are transmitted and received between D2D UEs. Therefore, each D2D UE needs a protocol stack for wideband communication and a protocol stack for D2D communication. The wideband communication system provides a protocol stack of a plurality of protocol layers on a control plane to control a UE and supports communication of the UE by independent operation of each protocol layer. Likewise, the protocol stack for D2D communication includes a plurality of protocol layers to support D2D communication of the UE.

Figure 2:
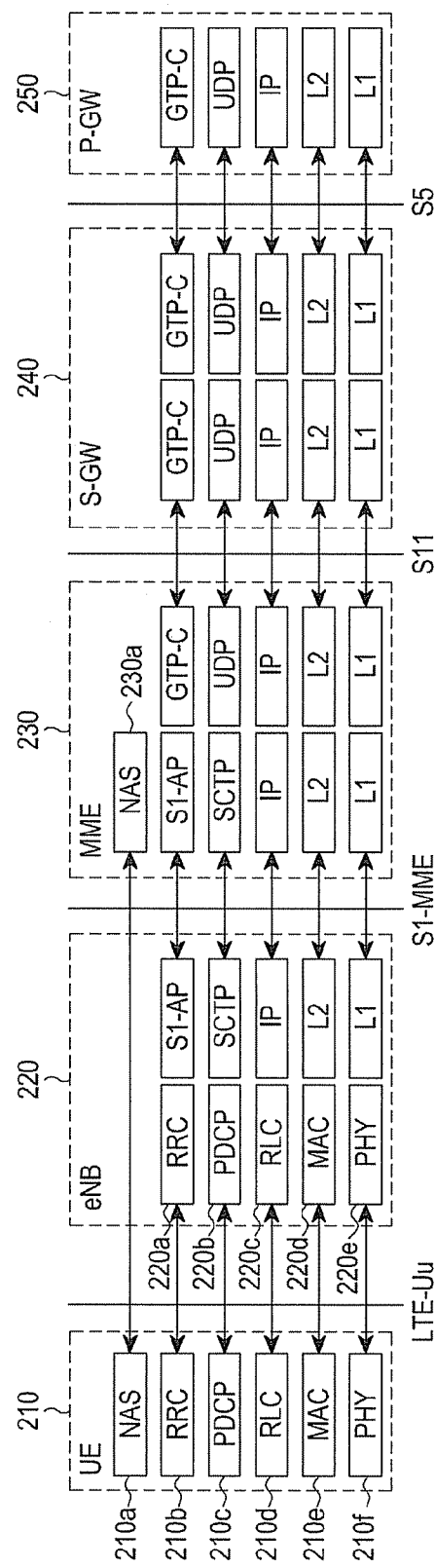
FIG. 2 illustrates control-plane protocol stacks for wideband communication according to an embodiment of the present disclosure.

FIG. 2 illustrates control-plane protocol stacks for wideband communication according to an embodiment of the present disclosure.

Referring to FIG. 2, protocol stacks of a UE 210, an eNB 220, an MME 230, an S-GW 240, and a P-GW 250 are shown. A radio interface between the UE 210 and the eNB 220, a radio interface between the eNB 220 and the MME 230, a radio interface between the MME 230 and the S-GW 240, and a radio interface between the S-GW 240 and the P-GW 250 are respectively called an LTE-Uu interface, an S1-MME interface, an S11 interface, and an S5 interface.

The control-plane protocol stack of the UE 210 includes a Non-Access Stratum (NAS) layer 210a, an RRC layer 210b, a Packet Data Convergence Protocol (PDCP) layer 210c, a Radio Link Control (RLC) layer 210d, a Medium Access Control (MAC) layer 210e, and a PHYsical (PHY) layer 210f.

The NAS layer 210a is a protocol layer by which the UE 210 communicates with the MME 230 to connect to a mobile communication network. The NAS layer 210a may be used to transmit a control signal to maintain a network connection between the UE 210 and the MME 230 and manage the mobility of the UE 210. In addition, the NAS layer 210a may be used to transmit a control signal related to handover of the UE 210 in an idle mode.

The RRC layer 210b is a protocol layer by which the UE 210 establishes a connection with the eNB 220 or maintains the connection. The RRC layer 210b is responsible for establishing or releasing radio resources needed to transmit control messages for communication between the UE 210 and the eNB 220. Also, the RRC layer 210b may be used for handover-related signaling of the UE 210 in a connected state.

On the control plane, the PDCP layer 210c compresses an RRC Protocol Data Unit (PDU) carrying data generated from the RRC layer 210b and ensures the integrity of the RRC PDU. Data is compressed in the PDCP layer of a transmitting entity and decompressed in the PDCP layer of a receiving entity.

The RLC layer 210d generates an RLC PDU by segmenting or concatenating PDCP PDUs received from the PDCP layer 210c to an appropriate size. Further, the RLC layer 210d may support Automatic Repeat reQuest (ARQ) to ensure the reliability of transmission data.

The MAC layer 210e supports data scheduling for data transmission between the UE 210 and the eNB 220. In the presence of a plurality of processes that generate data, the MAC layer 210e supports fair transmission of the data without an excessive delay using limited hardware resources. Specifically, the MAC layer 210e is a protocol layer responsible for ensuring data reliability through data scheduling, data multiplexing, and Hybrid ARQ (HARQ).

The PHY layer 210f transmits a MAC PDU generated from the MAC layer 210e physically to a receiving entity. In general, the PHY layer 210f may operate in a multiple access scheme such as Orthogonal Frequency Division Multiple Access (OFDMA) and Single Carrier Frequency Division Multiple Access (SC-FDMA) in an LTE system.

As described before, a control message generated from the RRC layer 210b is packetized in the PDCP layer 210c and the RLC layer 210d and then delivered to the PHY layer 210f through scheduling of the MAC layer 210e.

The MME 230 is an end point to the NAS layer 210a of the UE 210, and the NAS layer 210a exchanges control messages with the MNME 230. The eNB 220 simply passes a NAS message received from the UE 210 to the MME 230, without interpreting the NAS message or intervening in a NAS protocol. A NAS message may be used to manage the mobility of the UE 210 and transmit a network-related control message of the UE 210.

As described above, a control message of the UE 210 is designed to be generated from the RRC layer 210b and the NAS layer 210a and then transmitted to the network. Network entities are responsible for control admission or control configuration.

The eNB 220 includes an RRC layer 220a, a PDCP layer 220b, an RLC layer 220c, a MAC layer 220d, and a PHY layer 220e as the counterparts of the remaining protocol layers 210b to 210f of the UE 210 except for the NAS layer 210a. The eNB 220 further includes an S1 Application Protocol (S1-AP) layer, a Stream Control Transmission Protocol (SCTP) layer, an Internet Protocol (IP) layer, Layer 2 (L2), and Layer 1 (L1) to communicate with an entity of a core network such as the MME 230 on the control plane.

The MME 230 includes a NAS layer 230a as the counterpart of the NAS layer 210a of the UE 210. The MME 230 further includes an S1-AP layer, an SCTP layer, an IP layer, L2, and L1 to communicate with the eNB 220. In addition, the MME 230 includes a GPRS (General Packet Radio Service) Tunneling Protocol-Control (GTP-C) layer, a User Datagram Protocol (UDP) layer, an IP layer, L2, and L1 in order to communicate with the S-GW 240.

The S-GW 240 includes a GTP-C layer, a UDP layer, an IP layer, L2, and L1 as the counterparts of the protocol layers of the MME 230. The S-GW 240 further includes a GTP-C layer, a UDP layer, an IP layer, L2, and L1 to communicate with the P-GW 250. If the MME 230 also functions as the S-GW 240, the MME 230 may further include the protocol stack of the S-GW 240, which obviates the need for the protocol stacks for communication between the MME 230 and the S-GW 240. The P-GW 250 includes a GTP-C layer, a UDP layer, an IP layer, L2, and L1 as the counterparts of the protocol stack of the S-GW 240.

Figure 3:
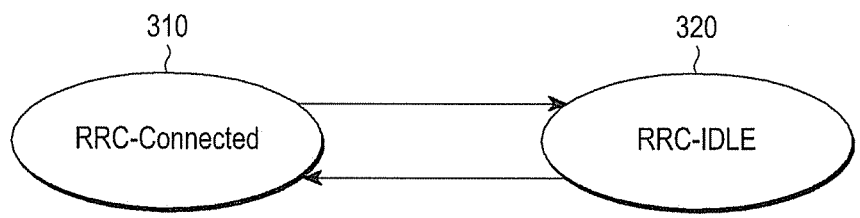
FIG. 3 illustrates Radio Resource Control (RRC) state transitions in a wideband communication system according to an embodiment of the present disclosure.

FIG. 3 illustrates RRC state transitions in a wideband communication system according to an embodiment of the present disclosure.

Referring to FIG. 3, an RRC layer for wideband communication may operate in two states: an RRC-Connected state 310 and an RRC-IDLE state 320. The RRC-Connected state 310 refers to a state where a UE attaches to a network, completes a connection setup with the network by an RRC protocol, and thus is capable of requesting a Signaling Radio Bearer (SRB) to the network. In the RRC-Connected state 310, the UE may transmit a control message to or receive a control message from the network in radio resources allocated by an eNB. The network keeps a UE context for the UE and manages the location of the UE in the RRC-Connected state 310.

If the RRC layer of the UE has not transmitted or received a signal for a predetermined time period, the UE transitions from the RRC-Connected state 310 to the RRC-IDLE state 320. In the RRC-IDLE state 320, the UE performs predetermined idle-mode operations including turning off or sleeping circuits related to wideband mobile communication, waking up every predetermined Discontinuous Reception (DRX) cycle, receiving information about a neighbor network and system information of a current cell, updating its location, or monitoring a paging message received from the network.

Figure 4:
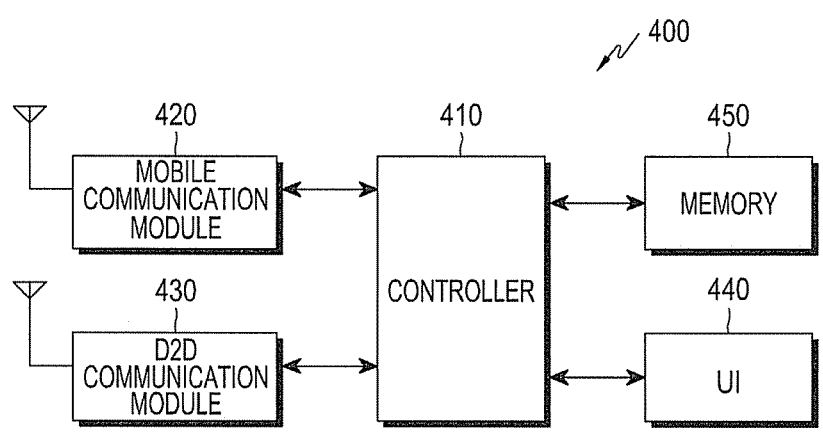
FIG. 4 is a block diagram of a User Equipment (UE) according to an embodiment of the present disclosure.

FIG. 4 is a block diagram of a UE according to an embodiment of the present disclosure. Herein, the UE is equipped with a D2D communication function and can access a wideband mobile communication system.

Referring to FIG. 4, a UE 400 includes a controller 410, a mobile communication module 420, a D2D communication module 430, a User Interface (UI) 440, and a memory 450. The UE 400 may include various additional components according to its specifications. For example, the UE 400 may further include at least one of a display for displaying a screen, an audio processor with a Microphone (MIC) and a Speaker (SPK), a camera module having a photo capturing function, a digital widecasting module, and a Bluetooth communication module, which will not be described or illustrated herein. While the mobile communication module 420 and the D2D communication module 430 are shown as separately configured, the mobile communication module 430 may incorporate a D2D communication function depending on implementation. For example, if D2D communication and mobile communication are conducted in the same radio resources, the mobile communication module 420 may have the D2D communication function.

The mobile communication module 420 includes a Radio Frequency (RF) circuit for exchanging radio signals with an eNB of the wideband mobile communication network and a Digital Signal Processor (DSP). The DSP of the mobile communication module 420 may be configured to implement a protocol stack for wideband communication. The D2D communication module 430 includes an RF circuit and a DSP to conduct D2D communication with another UE. The DSP of the D2D communication module 430 may be configured to implement a protocol stack for D2D communication. The communication modules 420 and 430 may wake up or operate in a sleep mode under the control of the controller 410. In another embodiment of the present disclosure, the protocol stack for wideband communication or D2D communication may be implemented in the controller 410.

The UI 440 senses a user's manipulation, generates an input signal corresponding to the sensed user's manipulation, outputs the input signal to the controller 410, and displays or outputs information to the user under the control of the controller 410. For this purpose, the UI 440 may include at least one of at least one logical or physical button, a display, a touch screen, a gesture sensing module, a speaker, and a microphone.

The memory 450 stores program codes and data executed and processed in the UE 400. The memory 450 may include one or more volatile memory devices and/or non-volatile memory devices. For example, the memory 450 may permanently or temporarily store an Operating System (OS) of the UE 400, application data, signals, information, and data exchanged through the communication modules 420 and 430, and the like.

The controller 410 provides overall control to the UE 400. The controller 410 may control operations related to execution of functions for providing a mobile communication service and/or a D2D communication service to the UE 400. Specifically, the controller 410 may control wake-up or sleep of the communication modules 420 and 430 according to states in each communication mode and state transition conditions which will be described later.

Figure 5:
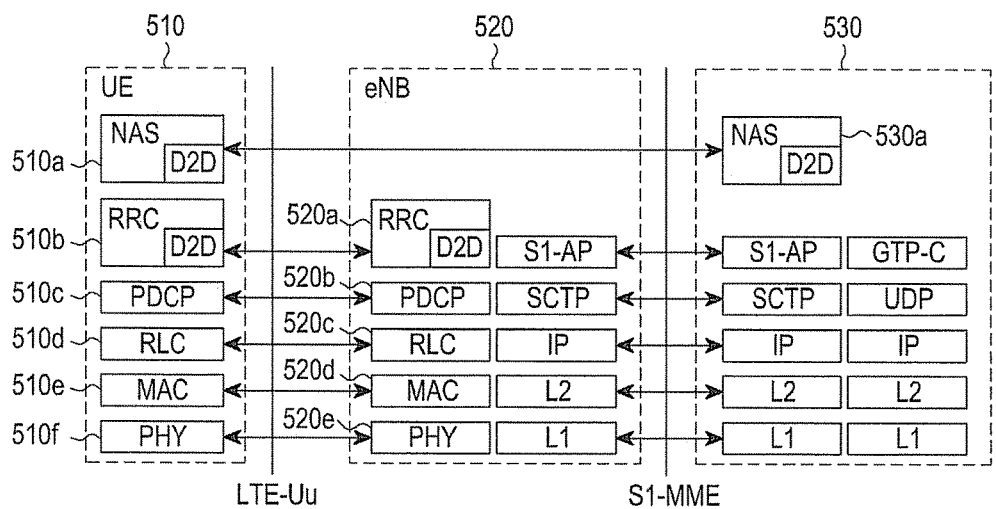
FIG. 5 illustrates protocol stacks to support D2D communication according to an embodiment of the present disclosure.

FIG. 5 illustrates protocol stacks for D2D communication according to an embodiment of the present disclosure.

Referring to FIG. 5, a UE 510 includes a NAS layer 510a, an RRC layer 510b, a PDCP layer 510c, an RLC layer 510d, a MAC layer 510e, and a PHY layer 510f. The NAS layer 510a and the RRC layer 510b of the UE 510 have a D2D function of processing control messages for D2D communication.

Specifically, in addition to basic RRC functionalities for mobile communication, the RRC layer 510b may generate and analyze messages related to control of radio resources among D2D controls. The NAS layer 510a may generate and analyze network-level messages for control of D2D communication in addition to basic NAS functionalities for mobile communication.

An eNB 520 includes an RRC layer 520a, a PDCP layer 520b, an RLC layer 520c, a MAC layer 520d, and a PHY layer 520e as the counterparts of the RRC layer 510b, the PDPC layer 510c, the RLC layer 510d, the MAC layer 510e, and the PHY layer 510f of the UE 510. The RRC layer 520a of the eNB 520 is responsible for generating, transmitting, receiving, and analyzing D2D control messages, in correspondence with the RRC layer 510b of the UE 510.

An MME 530 includes a NAS layer 530a configured to perform network-level D2D communication control as a counterpart of the NAS layer 510a of the UE 510.

Similarly to FIG. 3, the RRC layer 510b of the UE 510 operates in the RRC-Connected state or the RRC-IDLE state. If radio resources have been allocated only for D2D communication, not mobile communication, the RRC layer 510b is placed in the RRC-Connected state. If D2D communication is not conducted or not available, the RRC layer 510b transitions to the RRC-IDLE state. For D2D communication, the UE 510 switches the RRC layer 510b to the RRC-Connected state and is allocated radio resources for mobile communication and radio resources for D2D communication. In another embodiment of the present disclosure, radio resources may be shared between D2D communication and mobile communication. That is, since D2D communication is conducted in conjunction with mobile communication in the RRC layers 510b and 520a of the UE 510 and the eNB 520, the RRC layers 510b and 520a are placed in the RRC-Connected state, upon request for controlling radio resources for D2D communication or mobile communication. If both D2D communication and mobile communication are deactivated, the RRC layers 510b and 520a are placed in the RRC-IDLE state.

Figure 6:
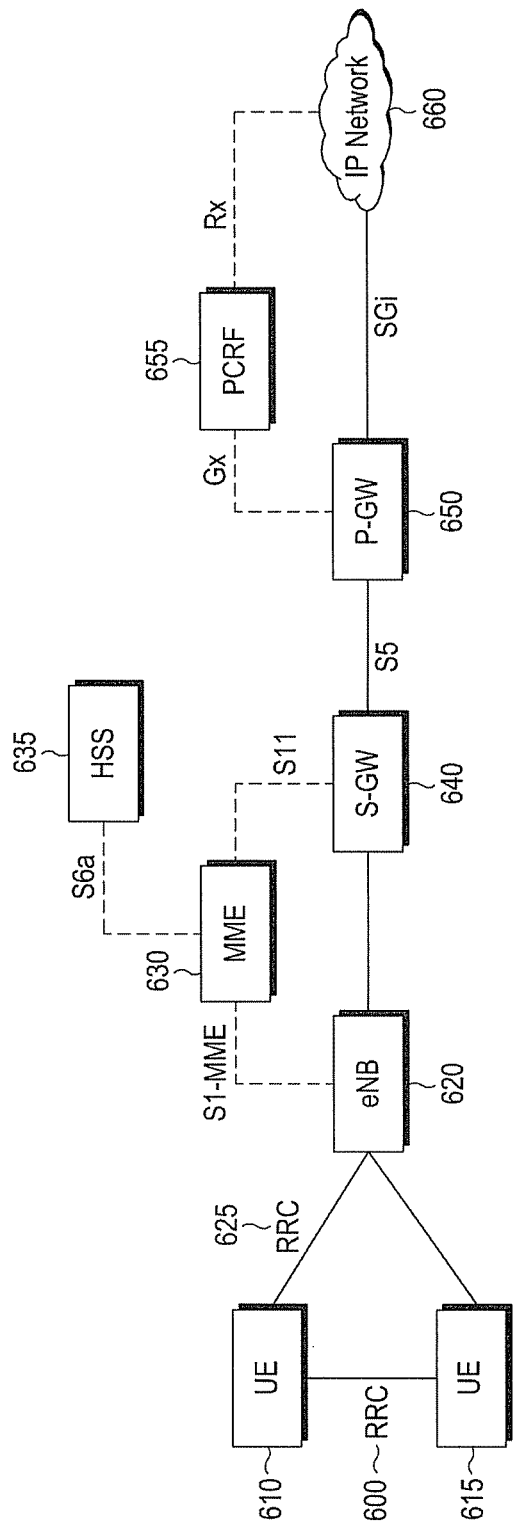
FIG. 6 illustrates a network reference model for a communication system supporting D2D communication according to the embodiment of the present disclosure.

FIG. 6 illustrates a network reference model for a communication system supporting D2D communication according to the embodiment of the present disclosure.

Referring to FIG. 6, the communication system includes UEs 610 and 615, at least one eNB 620 that establishes radio bearers, an MME 630 that manages the mobility of the UEs 610 and 615 and has a D2D control function, an S-GW 640 that connects the UEs 610 and 615 to an external network, a P-GW 650 that connects the S-GW 640 to an IP network 660 such as an Internet Multimedia Subsystem (IMS), a Home Subscriber System (HSS) 635 that manages subscriber profiles of the UEs 610 and 615 and provides the subscriber profiles to the MME 630, upon request, and a Policy and Charging Rules Function (PCRF) 655 between the P-GW 650 and the IP network 660, which generates and manages a Policy and Charging Control Rule (PCCR) for a mobile communication service.

The UEs 610 and 615 are D2D devices equipped with a D2D function. The UEs 610 and 615 also have functions for wideband mobile communication and may connect to the same eNB 620 or different eNBs. The eNB 620 manages and controls radio resources within its cell. Specifically, the eNB 620 controls radio bearers, accepts a radio request, and performs functions such as dynamic radio resource management, load balancing, and inter-cell interference control. The MME 630 is a network entity supporting the mobility of the UEs 610 and 615. The MME 630 supports functions such as handover and paging, and performs functions such as authentication, security key management, and roaming for the UEs 610 and 615 in conjunction with the HSS 635. To perform these functions, the MME 630 may exchange NAS signals with the UEs 610 and 615.

The S-GW 640 distributes data to the eNB 620 managed by the S-GW 640 and serves as an anchoring point for handover between eNBs. The P-GW 650 supports connectivity between the UEs 610 and 615 and an external network and provides a packet filtering function. Further, the P-GW 650 allocates IP addresses to the UEs 610 and 615 and charges the UEs 610 and 615 for communication services based on the PCC rule provided by the PCRF 655.

At least one of the UEs 610 and 615 is connected to the eNB 620 via an LTE-Uu interface, that is, an RRC connection 625. When the UE 610 wants a D2D connection to the UE 615, the UE 610 may establish a connection with the UE 615 via an LTE-Uu interface, that is, an RRC connection 600. The RRC connections 600 and 625 for mobile communication and D2D communication are processed in one RRC layer of the UE 610. In another embodiment of the present disclosure, the RRC connection 600 for D2D communication and the RRC connection 625 for mobile communication may use the same radio resources and the eNB 620 may configure the radio resources in advance or upon receipt of a request for a D2D connection. While only the UE 610 initiating D2D communication is connected to the eNB 620, a similar RRC connection scheme may be used, when the UE 615 needs to attach to the eNB 620.

The eNB 620 is connected to the MME 630 via an S1-MME interface and uses an S1-AP protocol on the S1-MME interface. Upon receipt of a D2D control message directed to the MME 630 from the UE 610 or upon generation of a D2D control message in the eNB 620, the eNB 620 transmits the D2D control message to the MME 630 via the same S1-MME interface as used for mobile communication. Upon receipt of a D2D control message from the MME 630 via the S1-MME interface, the eNB 620 transmits the D2D control message to the UE 610 via the RRC connection 625.

The MME 630 is connected to the HSS 635 via an S6a interface and receives subscriber information and security information required to support D2D communication from the HSS 635 via the S6a interface.

The NAS layers of the UE 610 and the MME 630 on the control plane process the mobility of the UE 610 and provide session control. The UE 610 and the MME 630 communicate with each other by NAS messages. Functions of a NAS layer are largely divided into EPS (Evolved Packet System) Mobility Management (EMM) and EPS session management.

The EMM is a sublayer of the NAS layer. As an EMM procedure is performed, the EMM may operate in an EMM-Registered state or an EMM-Deregistered state. A NAS protocol-based EMM procedure includes Globally Unique Temporary Identifier (GUTI) allocation, authentication, UE identification, Security Mode Control (SMC), EMM information, attach, detach, Tracking Area Update (TAU), service request, paging, and NAS message transmission, through a NAS signaling connection between the UE 610 and the MME 630.

For transmission and reception of NAS messages between the UE 610 and the MME 630, a signaling connection for delivering NAS messages is required between the UE 610 and the MME 630. This signaling connection is referred to as an EPS Connection Management (ECM) connection. The ECM connection is a logical connection that actually includes the RRC connection 625 between the UE 610 and the eNB 620 and an S1 signaling connection between the eNB 620 and the MME 630. Establishment/release of the ECM connection means that both the RRC connection and the S1 signaling connection are established/released.

The EMM has the EMM-Registered state or the EMM-Deregistered state depending on whether the UE 610 has attached to or detached from a network. The ECM has an ECM-Connected state and an ECM-IDLE state depending on the presence or absence of the NAS signaling connection, that is, the ECM connection. The RRC has the RRC-Connected state or the RRC-IDLE state depending on the presence or absence of an established RRC connection. A combination of the EMM, ECM, and RRC states varies with an EMM procedure and/or an RRC operation event. This change is called a state transition. Since the RRC connection is a part of the ECM connection, the ECM and the RRC are in the same state from the perspective of the UE 610.

Figure 7:
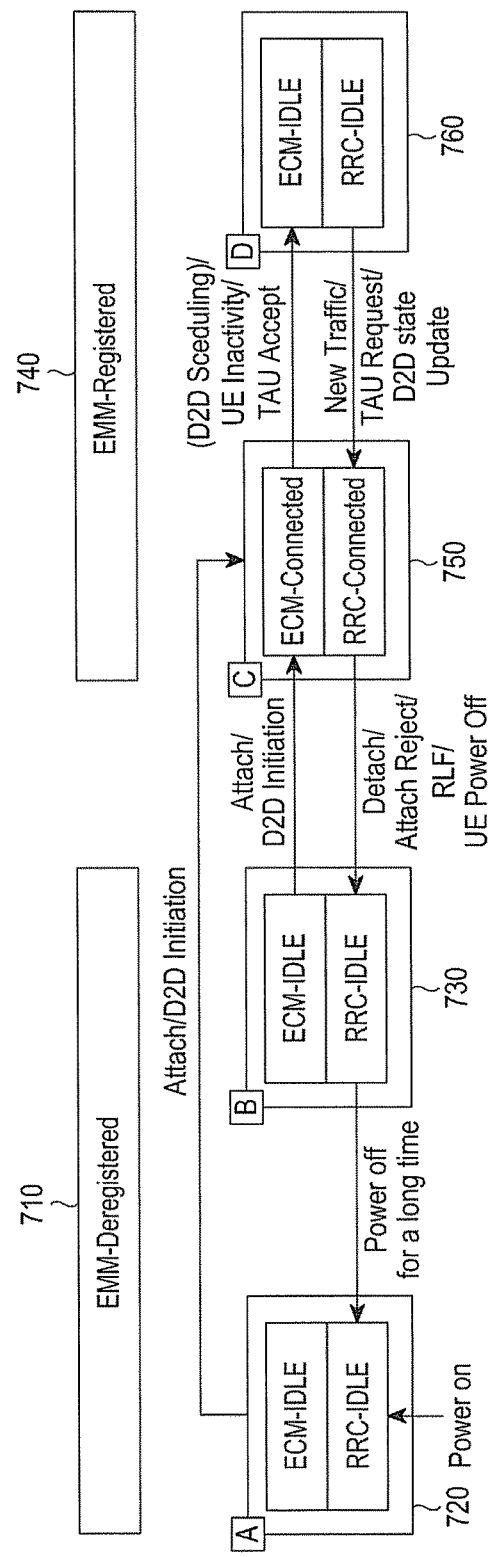
FIG. 7 illustrates state transitions of a UE to support D2D communication according to the embodiment of the present disclosure.

FIG. 7 illustrates state transitions of a UE to support D2D communication according to the embodiment of the present disclosure. While the following description is given mainly of a state transition operation of a UE, it is to be understood that the state transition of the UE takes place by a common algorithm in the UE, an eNB, and an MME. That is, when the UE transitions from one state to another state, the eNB and the MME manage the state of the UE in the same manner as the UE.

Referring to FIG. 7, the UE is largely placed in an EMM-Deregistered state 710 or an EMM-Registered state 740. The EMM-Deregistered state 710 includes an A state 720 defined by ECM-IDLE and RRC-IDLE, in which the MME does not have any information except for provisioning information (that is, subscriber information) about the UE, and a B state 730 defined by ECM-IDLE and RRC-IDLE, in which the MME preserves a GUTI and a NAS security context allocated to the UE during a previous network attachment. The EMM-Registered state 740 includes a C state 750 defined by ECM-Connected and RRC-Connected and a D state 760 defined by ECM-IDLE and RRC-IDLE.

The states of each layer are summarized in the following Table 1.

TABLE 1

| Layer | State | State Description |
| --- | --- | --- |
| EMM | Registered | The UE is connected to the network and the MME knows the location of the UE. An IP address for S5 has been allocated to the UE. |
| | De-registered | The UE is not connected to the network and the MME knows only the last Tracking Area (TA) location of the TIE. |
| ECM | Connected | A radio bearer for signaling/data and network resources of S1 have been allocated to the UE. |
| | IDLE | A radio bearer for signaling/data and network resources of S1 have not been allocated to the UE. |
| RRC | Connected | RRC connection setup is completed and thus the UE can request an SRB. |
| | IDLE | An RRC connection has not been established. |

Now, state transition conditions for a UE will be described below.

When the UE is initially powered on, the UE is placed in the A state 720. If the UE is powered off for a predetermined time or the UE is not attached to a network for a predetermined time in the B state 730, the UE transitions to the A state 720. The eNB and the MME manage the UE as placed in the A state 720. The predetermined time may be a time period over which the network preserves a context related to the UE.

If D2D initiation is decided to initiate D2D communication in the A and B states 720 and 730, the UE transitions to the C state 750 and performs a D2D initiation procedure. The D2D initiation may be performed in an attach procedure for mobile communication initiation or in an independent procedure. In an embodiment of the present disclosure, upon execution of an application for D2D communication by a user or upon receipt of a request for a D2D communication service (for example, file transmission or the like) from the user, the UE may determine to perform the D2D initiation procedure.

The C state 750 refers to a state in which the UE has completed initial attachment to a wideband mobile communication system and registered to the network, and service use has been activated. In the C state 750, the UE may transmit a control message and data to the network and may transmit a D2D control message and D2D data to a correspondent UE. Radio resources for D2D communication and mobile communication have been allocated to the UE, and thus, the UE may communicate with the network via an S1 interface in the C state 750.

If UE inactivity occurs or an ECM/RRC connection is released in the C state 750 because of no signal is generated for mobile communication and D2D communication for a predetermined time period, the UE transitions to the D state 760. In the D state 760, resources have not been allocated to the ECM connection on the control plane and resources have not been allocated to the remaining bearers except for an S5 bearer on the user plane.

If the UE determines not to use either of mobile communication and D2D communication in the C state 750, the UE is detached from the network and transitions to the B state 730. If the UE wants to continue mobile communication, while detaching from D2D communication, the UE stays in the C state 750 without transitioning to the B state 730. If the network rejects the D2D initiation for a special reason, a Radio Link Failure (RLF) occurs, or the UE is powered off, the UE transitions from the C state 750 to the B state 730.

If a service has not been used for a predetermined time period in the C state 750, the UE determines that a deactivation condition is satisfied and transitions to the D state 760. On the other hand, if a signal is still transmitted or received for one of D2D communication and mobile communication, the UE does not transition to the D state 760.

The UE transitions from the D state 760 to the C state 750 under the following conditions:

Upon generation of an uplink signal to be transmitted to the mobile communication network or a downlink signal to be transmitted from the mobile communication network, the UE transitions to the C state 750 and transmits the uplink signal or receives the downlink signal.

If TAU is required due to a change in the TA of the UE or expiration of a TAU timer in an idle state, the UE may transition from the D state 760 to the C state 750, perform the TAU, and then return to the D state 760 upon receipt of a TAU acknowledgment from the network.

If a D2D state update is required due to expiration of a D2D security key or generation of charging information to be transmitted to the network, the UE transitions to the C state 750 and performs the D2D state update. Upon, completion of the D2D state update, the UE may return to the D state 760. If the eNB is configured to allocate resources for D2D discovery of the UE by D2D scheduling, the UE transitions to the C state 750 and receives a resource schedule for D2D discovery from the eNB. Upon completion of the scheduling, the UE may return to the D state 760.

Figure 8:
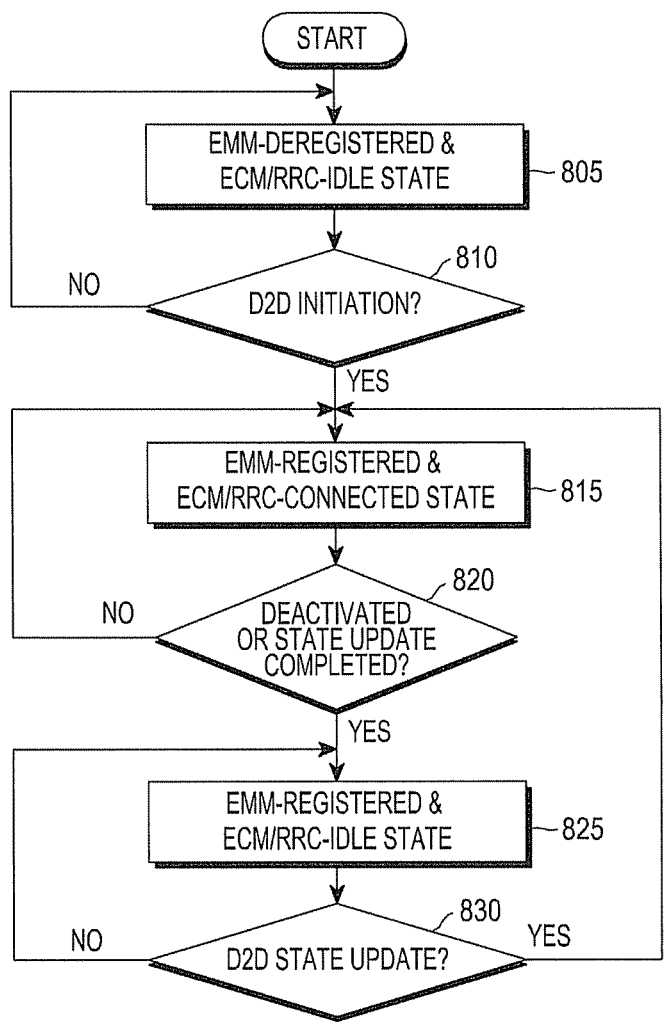
FIG. 8 is a flowchart illustrating a state transition operation of a UE according to the embodiment of the present disclosure.

FIG. 8 is a flowchart illustrating a state transition operation of a UE according to the embodiment of the present disclosure. An exemplary state transition flow related to D2D communication is shown in FIG. 8.

Referring to FIG. 8, the UE operates in the A or B state defined by EMM-Deregistered and ECM/RRC-IDLE in operation 805. In operation 810, the UE determines whether D2D initiation is required. In an embodiment of the present disclosure, upon execution of an application for D2D communication by a user, the UE may determine to perform the D2D initiation. If the D2D initiation is not required, the UE stays in the A or B state. On the other hand, if the D2D initiation is required in the A or B state, the UE transitions to the C state defined by EMM-Registered and ECM/RRC-Connected and performs the D2D initiation through a mobile communication network in operation 815.

In operation 820, the UE determines whether a preset deactivation condition such as the absence of a signal delivered through an ECM/RRC connection for a predetermined time period is satisfied or a D2D state update has been completed. If the condition is not satisfied, the UE stays in the C state. On the contrary, if the condition is satisfied, the UE transitions to the D state defined by EMM-Registered and ECM/RRC-IDLE in operation 825. In operation 830, the UE determines whether a state update or scheduling for D2D communication is required in the D state. If the state update or scheduling for D2D communication is required, the UE returns to operation 815 in order to transition to the C state.

Figure 9:
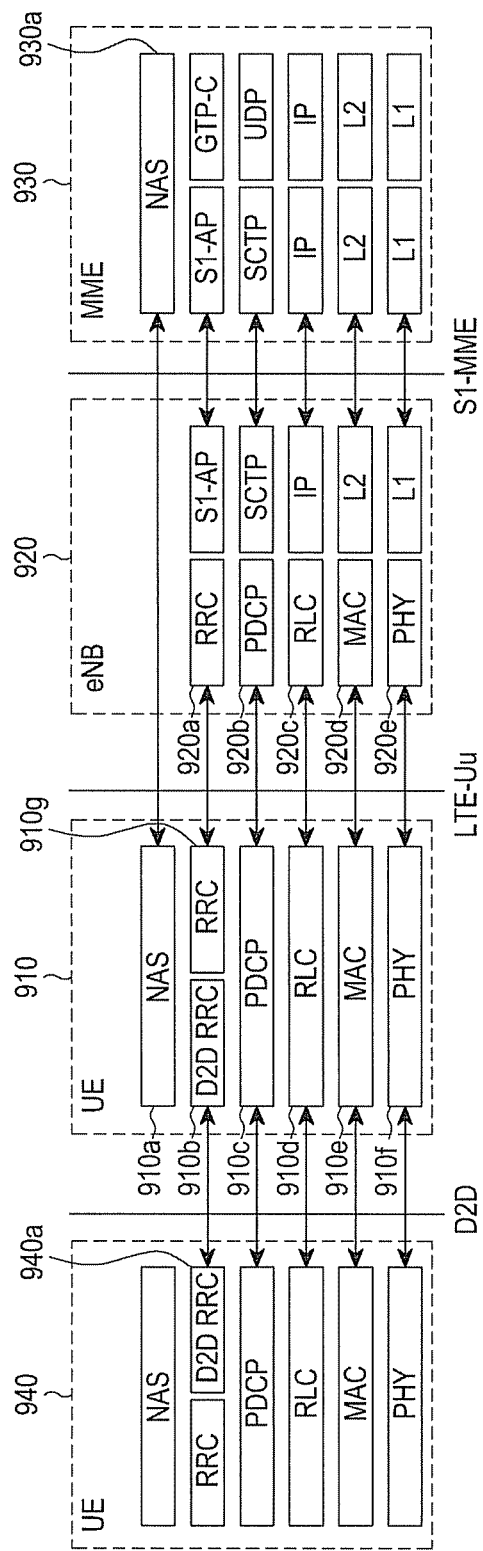
FIG. 9 illustrates protocol stacks to support D2D communication according to another embodiment of the present disclosure.

FIG. 9 illustrates protocol stacks for D2D communication according to another embodiment of the present disclosure.

Referring to FIG. 9, a UE 910 includes a NAS layer 910a, an RRC layer 910b for D2D communication (hereinafter, referred to as a D2D RRC layer 910b), an RRC layer 910g for mobile communication (hereinafter, referred to as a mobile-communication RRC layer 910g), a PDCP layer 910c, an RLC layer 910d, a MAC layer 910e, and a PHY layer 910f. As illustrated in FIG. 9, the UE 910 includes the D2D RRC layer 910b between the NAS layer 910a and the PDCP layer 910c, which may operate independently of the mobile-communication RRC layer 910g. The NAS layer 910a may be activated by the mobile-communication RRC layer 910g or the D2D RRC layer 910b.

An eNB 920 includes an RRC layer 920a, a PDCP layer 920b, an RLC layer 920c, a MAC layer 920d, and a PHY layer 920e as the counterparts of the mobile-communication RRC layer 910g, the PDPC layer 910c, the RLC layer 910d, the MAC layer 910e, and the PHY layer 910f of the UE 910.

The D2D RRC layer 910b of the UE 910 is responsible for performing an operation related to control of radio resources for D2D communication and exchanging control signals with a D2D RRC layer 940a of a correspondent D2D UE 940. The mobile-communication RRC layer 910g controls radio resources for wideband mobile communication and thus establishes a connection with the RRC layer 920a of the eNB 920. The D2D RRC layer 910b and the mobile-communication RRC layer 910g operate independently.

An MME 930 includes a NAS layer 930a configured to perform network-level D2D communication control as a counterpart of the NAS layer 910a of the UE 910. Control messages directed from the UE 910 to the network are delivered through the mobile-communication RRC layer 910g and the NAS layer 910a. Upon generation of a D2D control message directed to the network, the UE 910 transmits the D2D control message to the eNB 920 through the mobile-communication RRC layer 910g using a wideband mobile communication protocol.

When radio resources for D2D communication are allocated, the D2D RRC layer 910b of the UE 910 is placed in a D2D-Enable state. If D2D communication is not conducted or not available, the D2D RRC layer 910b is placed in a D2D-Disable state. The state of the D2D RRC layer 910b is independent of the state of the mobile-communication RRC layer 910g and a control operation is also performed for D2D communication independently of a control operation for mobile communication. Upon generation of a D2D control message directed to the network, the UE 910 transmits the D2D control message through the mobile-communication RRC layer 910g and the NAS layer 910a. If the mobile-communication RRC layer 910g and the NAS layer 910a are in an IDLE state, the UE 910 switches the mobile-communication RRC layer 910g and/or the NAS layer 910a to a Connected state and then processes the D2D control message.

Figure 10:
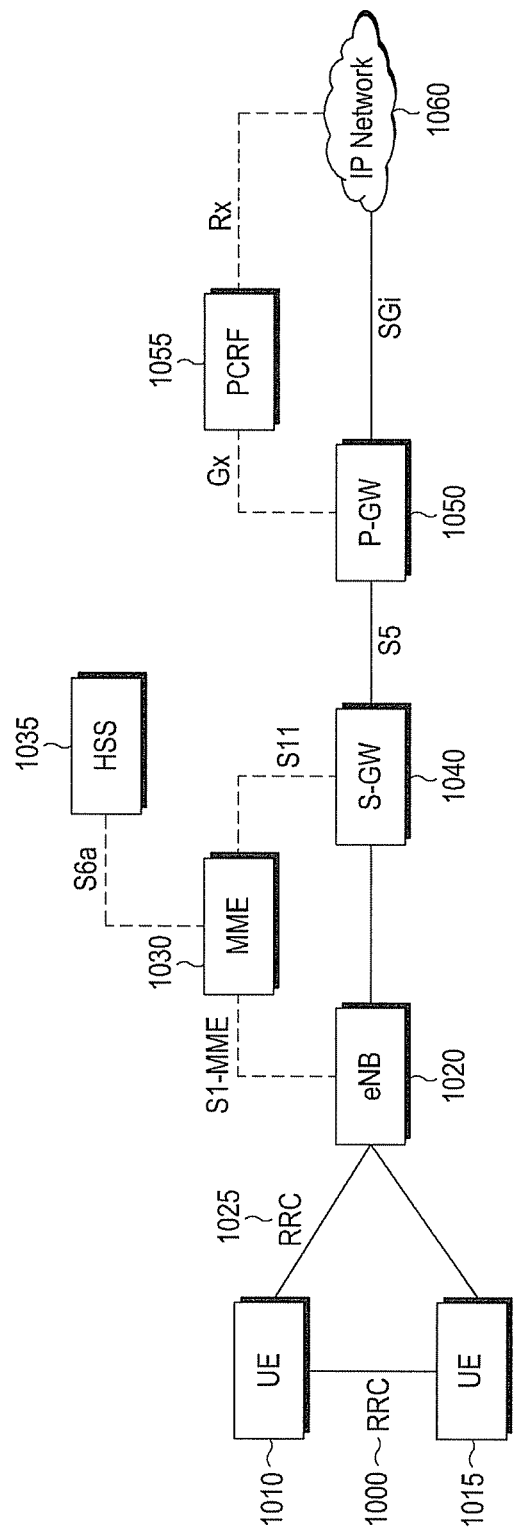
FIG. 10 illustrates a network reference model for a communication system supporting D2D communication according to the second embodiment of the present disclosure.

FIG. 10 illustrates a network reference model for a communication system supporting D2D communication according to the second embodiment of the present disclosure.

Referring to FIG. 10, the communication system includes UEs 1010 and 1015, at least one eNB 1020 that establishes radio bearers, an MME 1030 that manages the mobility of the UEs 1010 and 1015 and has a D2D control function, an S-GW 1040 that connects the UEs 1010 and 1015 to an external network, a P-GW 1050 that connects the S-GW 1040 to an IP network 1060 such as an IMS, an HSS 1035 that manages subscriber profiles of the UEs 1010 and 1015 and provides the subscriber profiles to the MME 1030, and a PCRF 1055 between the P-GW 1050 and the IP network 1060, which generates and manages a PCC rule for a mobile communication service.

The UEs 1010 and 1015 are D2D devices equipped with a D2D function. The UEs 1010 and 1015 also have functions for wideband mobile communication and may connect to the same eNB 1020 or different eNBs. The eNB 1020 manages and controls radio resources within its cell. Specifically, the eNB 1020 controls radio bearers, accepts a radio request, and performs functions such as dynamic radio resource management, load balancing, and inter-cell interference control. The MME 1030 is a network entity supporting the mobility of the UEs 1010 and 1015. The MME 1030 supports functions such as handover and paging, and performs functions such as authentication, security key management, and roaming for the UEs 1010 and 1015 in conjunction with the HSS 1035. To perform these functions, the MME 1030 may exchange NAS signals with the UEs 1010 and 1015.

The S-GW 1040 distributes data to the eNB 1020 managed by the S-GW 1040 and serves as an anchoring point for handover between eNBs. The P-GW 1050 supports connectivity between the UEs 1010 and 1015 and an external network and provides a packet filtering function. Further, the P-GW 1050 allocates IP addresses to the UEs 1010 and 1015 and charges the UEs 1010 and 1015 for communication services based on a PCC rule provided by the PCRF 1055.

If the UE 1010 wants to initiate D2D communication, the UE 1010 attaches to the eNB 1020 via an RRC connection 1025. Also, the UE 1010 is connected to the UE 1015 via a D2D RRC connection 1000. The D2D RRC connection 1000 is independent of the RRC connection 1025 for communication between the UE 1010 and the network. In an embodiment of the present disclosure, the D2D RRC connection 1000 may be allocated by the eNB 1020 and the eNB 1020 may allocate radio resources for the D2D RRC connection 1000 independently of radio resources for the RRC connection 1025.

The eNB 1020 is connected to the MME 1030 via an S1-MME interface and uses an S1-AP protocol on the S1-MME interface. Upon receipt of a D2D control message directed to the MME 1030 from the UE 1010 or upon generation of a D2D control message in the eNB 1020, the eNB 1020 transmits the control message to the MME 1030 via the same S1-MME interface as used for mobile communication. Upon receipt of a D2D control message from the MME 1030 via the S1-MME interface, the eNB 1020 transmits the D2D control message to the UE 1010 via the RRC connection 1025.

The MME 1030 is connected to the HSS 1035 via an S6a interface and receives subscriber information and security information required to support D2D communication from the HSS 1035 via the S6a interface.

Figure 11:
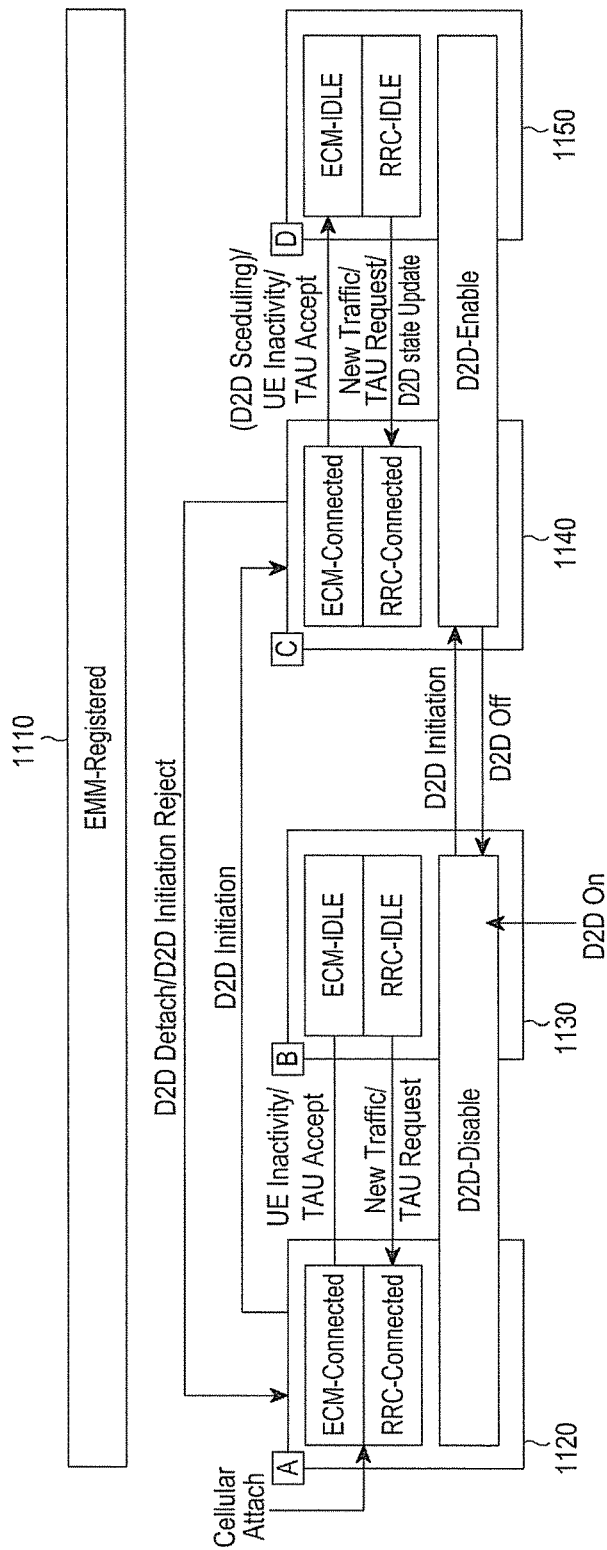
FIG. 11 illustrates state transitions of a UE to support D2D communication according to the second embodiment of the present disclosure.

FIG. 11 illustrates state transitions of a UE to support D2D communication according to the second embodiment of the present disclosure. While the following description is given mainly of a state transition operation of a UE, it is to be understood that the state transition of the UE takes place by a common algorithm in the UE, an eNB, and an MME. That is, when the UE transitions from one state to another state, the eNB and the MME manage the state of the UE in the same manner as the UE. Since D2D communication is not available in an EMM-Deregistered state of a NAS layer where the UE is not connected to a network, only an EMM-Registered state 1110 will be described below.

Referring to FIG. 11, the EMM-Deregistered state 1110 includes an A state 1120 defined by ECM-Connected, RRC-Connected, and D2D-Disable, a B state 1130 defined by ECM-IDLE, RRC-IDLE, and D2D-Disable, a C state 1140 defined by ECM-Connected, RRC-Connected, and D2D-Enable, and a D state 1150 defined by ECM-IDLE, RRC-IDLE, and D2D-Enable.

The states of each layer are summarized in the following Table 2.

TABLE 2

| Layer | State | State Description |
|---|---|---|
| EMM | Registered | The UE is connected to the network and the MME knows the location of the UE. An IP address for S5 has been allocated to the UE. |
| | Deregistered | The UE is not connected to the network and the MME knows only the last TA location of the UE. |
| ECM | Connected | A radio bearer for signaling/data and network resources of S1 have been allocated to the UE. |
| | IDLE | A radio bearer for signaling/data and network resources of S1 have not been allocated to the UE. |
| RRC | Connected | RRC connection setup is completed and thus the UE can request an SRB. |
| | IDLE | An RRC connection has not been established. |
| D2D | Enable | D2D operation has been authenticated and all operations related to D2D communication are available. |
| | Disable | D2D operation is impossible. |

As described above, a D2D-Enable state 1140 and 1150 refers to a state in which as a D2D registration procedure has been completed, radio resources are allocated for D2D communication. In the D2D-Enable state 1140 and 1150, all D2D functions are available, such as synchronization between UEs, UE discovery, data transmission between UEs, and the like. The D2D-Enable state 1140 and 1150 includes a sleep state of a D2D UE. A D2D-Disable state 1120 and 1130 refers to a state in which radio resources are not allocated for D2D communication. The D2D-Disable state 1120 and 1130 includes power-off.

Now, state transition conditions for a UE will be described below.

In the EMM-Deregistered state, that is, in the state where the UE is not connected to the wideband communication system, upon request of attachment to a cellular mobile communication network, the UE transitions to the A state 1120.

The A state 1120 refers to a state where the UE has completed initial attachment to the network and registered to the network, and service use has been activated. In the A state 1120, the UE has been allocated resources for wideband mobile communication and an S1 interface. Thus the UE may communicate with the MME. In the A state 1120, the UE may transmit a control message and data to the network through the RRC layer and the NAS layer.

If UE inactivity occurs or an ECM/RRC connection is released in the A state 1120, the UE transitions to the B state 1130. In the B state 1130, resources have not been allocated to the ECM connection on the control plane and resources have not been allocated to the remaining bearers except for an S5 bearer on the user plane.

If the UE decides on D2D initiation to initiate D2D communication in the A and B states 1120 and 1130, the UE transitions to the C state 1140 and performs a D2D initiation procedure. While D2D communication is conducted by an RRC protocol and an RRC interface independent of wideband mobile communication, the D2D initiation procedure triggers generation of control messages directed to the network, and thus, an RRC connection at the RRC layer and an ECM connection at the NAS layer are needed for wideband mobile communication. Accordingly, when the UE transitions from the B state 1130 to the C state 1140 for D2D initiation, the UE switches the RRC state and the ECM state from IDLE to Connected through reattachment. The D2D initiation may be included in an attach procedure for mobile communication initiation or may be performed in an independent procedure.

While not shown, if D2D initiation is requested in the EMM-Deregistered state, that is, in the state where the UE is not connected to the wideband system, the UE may transition to the C state 1140 defined by EMM-Registered and ECM/RRC-Connected by transmitting a D2D initiation message to the network in the attach procedure for mobile communication or by performing an independent D2D initiation procedure.

The C state 1140 refers to a state where the UE has completed the D2D initiation procedure to the wideband mobile communication system and registered to the network and service use has been activated. In the C state 1140, the UE may transmit a control message and data to the network and transmit a D2D control message and D2D data to a corresponding UE. The UE has resources allocated for D2D communication and mobile communication and resources allocated for S1 communication, and may communicate with the network via an S1 interface, when needed.

If UE inactivity occurs or the ECM/RRC connection is released in the C state 1140, the UE transitions to the D state 1150. In the D state 1150, resources have not been allocated to the ECM connection on the control plane and resources have not been allocated to the remaining bearers except for an S5 bearer on the user plane. However, the UE may use D2D communication normally in the D state 1150. For D2D communication, the UE uses security information and/or a D2D user context received in advance from the network or stored in the UE. A D2D operation without control of the network as in the D state 1150 is referred to as a D2D independent mode. In an embodiment of the present disclosure, the UE may operate in the D2D independent mode, for Public Protection and Disaster Relief (PPDR) or an emergency call.

If the UE determines not to use either of mobile communication and D2D communication in the C state 1140, the UE is detached from the network and transitions to the B state 1130. If the UE wants to continue mobile communication, while detaching from D2D communication, the UE may perform only D2D detachment at the D2D RRC layer in the C state 1140 and then transition to the A state 1120. If the network rejects D2D initiation for a special reason, the UE also transitions from the C state 1140 to the A state 1120.

If traffic of wideband mobile communication has not been generated for a predetermined time period or longer in the C state 1140, the UE determines that a deactivation condition is satisfied, performs detachment at the RRC layer, and transitions to the D state 1150. In the D state 1150, the UE may continue D2D communication.

The UE transitions from the D state 1150 to the C state 1140 under the following conditions:

Upon generation of an uplink signal to be transmitted to the mobile communication network or a downlink signal to be transmitted from the mobile communication network, the UE transitions to the C state 1140 and transmits the uplink signal or receives the downlink signal.

If TAU is to be performed due to a change in the TA of the UE or expiration of a TAU timer in an IDLE state, the UE may transition from the D state 1150 to the C state 1140, perform the TAU, and then return to the D state 1150, upon receipt of a TAU acknowledgment from the network.

If the UE needs a D2D state update due to expiration of a D2D security key or generation of charging information to be transmitted to the network, the UE transitions to the C state 1140 and performs the D2D state update. Upon completion of the D2D state update, the UE may return to the D state 1150. If the eNB is configured to allocate resources for D2D discovery of the UE by D2D scheduling, the UE transitions to the C state 1140 and receives a D2D scheduling assignment from the eNB via a mobile communication-RRC connection. Subsequently, the UE may return to the D state 1150 and manage the ECM/RRC connection for mobile communication in the IDLE state.

Figure 12:
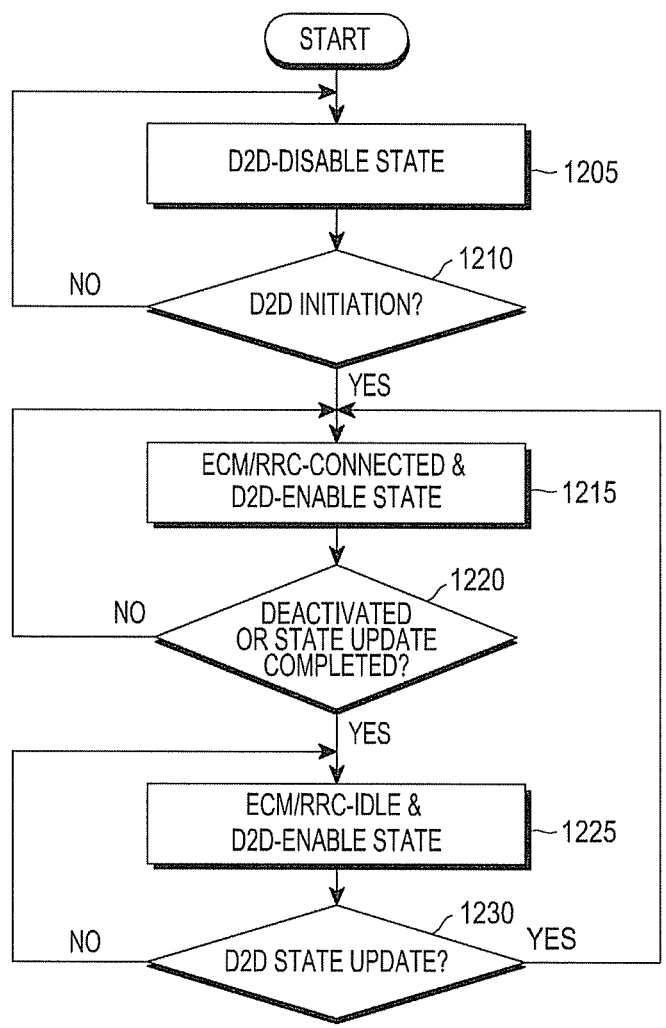
FIG. 12 is a flowchart illustrating a state transition operation of a UE according to the second embodiment of the present disclosure.

FIG. 12 is a flowchart illustrating a state transition operation of a UE according to the second embodiment of the present disclosure. An exemplary state transition flow related to D2D communication in the EMM-Registered state is shown in FIG. 12.

Referring to FIG. 12, the UE operates in the A or B state defined by D2D-Disable where D2D communication is not conducted in operation 1205. The D2D-Disable state includes the ECM/RRC-Connected state (in the case of the A state) or the ECM/RRC-IDLE state (in the case of the B state). In operation 1210, the UE determines whether D2D initiation is required. In an embodiment of the present disclosure, upon execution of an application for D2D communication by a user, the UE may decide to perform the D2D initiation. If the D2D initiation is not required, the UE stays in the A or B state. On the other hand, if the D2D initiation is required in the A or B state, the UE transitions to the C state defined by ECM/RRC-Connected and D2D-Enable and performs the D2D initiation through a mobile communication network in operation 1215. Upon completion of the D2D initiation, the UE may exchange information or data with a correspondent UE by D2D communication.

In operation 1220, the UE determines whether a preset deactivation condition such as the absence of a signal delivered through an ECM/RRC connection for a predetermined time period is satisfied or a D2D state update has been completed. If the condition is not satisfied, the UE stays in the C state. On the contrary, if the condition is satisfied, the UE transitions to the D state defined by ECM/RRC-IDLE and D2D-Enable in operation 1225. In operation 1230, the UE determines whether a state update or scheduling for D2D communication is required in the D state. If the state update or scheduling for D2D communication is required, the UE returns to operation 1215 in order to transition to the C state.

Figure 13:
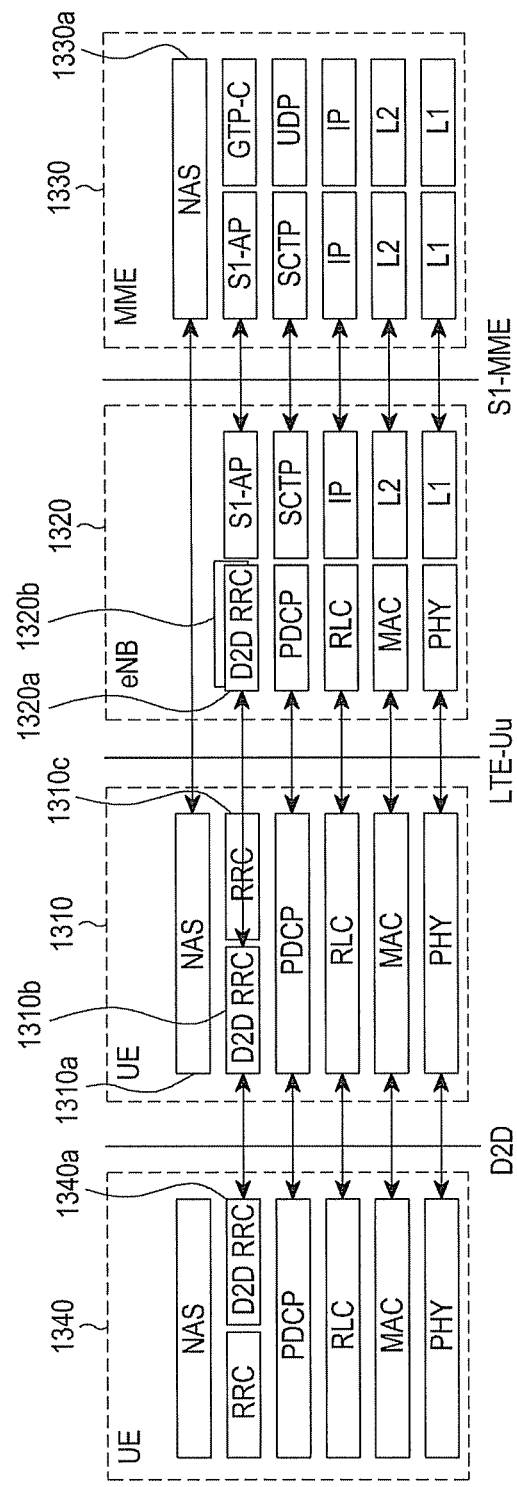
FIG. 13 illustrates protocol stacks to support D2D communication according to a third embodiment of the present disclosure.

FIG. 13 illustrates protocol stacks for D2D communication according to a third embodiment of the present disclosure.

Referring to FIG. 13, a UE 1310 includes a NAS layer 1310*a*, a D2D RRC layer 1310*b*, a mobile-communication RRC layer 1310*c*, a PDCP layer, an RLC layer, a MAC layer, and a PHY layer. As illustrated in FIG. 13, the UE 1310 includes the D2D RRC layer 1310*b* between the NAS layer 1310*a* and the PDCP layer, which may operate independently of the mobile-communication RRC layer 1310*c*. The NAS layer 1310*a* may be activated by the mobile-communication RRC layer 1310*c* or the D2D RRC layer 1310*b*. The D2D RRC layer 1310*b* may communicate a D2D RRC layer 1340*a* of a correspondence UE 1340 and may communicate with a D2D RRC layer 1320*a* of an eNB 1320 at the same time or separately.

The D2D RRC layer 1310*b* of the UE 1310 is responsible for performing an operation related to control of radio resources for D2D communication and exchanging control signals with the D2D RRC layer 1340*a* of the corresponding UE 1340. The mobile-communication RRC layer 1310*c* controls radio resources for wideband mobile communication and thus establishes a connection with an RRC layer 1320*b* of the eNB 1320. The D2D RRC layer 1310*b* and the mobile-communication RRC layer 1310*c* operate independently.

As described above, the mobile-communication RRC layers 1310*c* and 1320*b* of the UE 1310 and the eNB 1320 are used to control radio resources for wideband mobile communication, whereas the D2D RRC layers 1310*b* and 1320*a* of the UE 1310 and the eNB 1320 are used to control radio resources for D2D communication. The D2D RRC layers 1310*b* and 1320*a* establish a D2D RRC connection independently of the mobile-communication RRC layers 1310*c* and 1320*b* for mobile communication. The same radio resources or different radio resources may be used for the D2D RRC connection and the mobile-communication RRC connection.

An MME 1330 includes a NAS layer 1330*a* configured to perform network-level D2D communication control as a counterpart of the NAS layer 1310*a* of the UE 1310. Mobile-communication control messages directed from the UE 1310 to the network are delivered through the mobile-communication RRC layer 1310*c* and the NAS layer 1310*a*, whereas D2D control messages from the UE 1310 directed to the network are delivered through the D2D RRC layer 1310*b* and the NAS layer 1310*a*.

In this manner, a D2D RRC protocol is extended from the UE 1310 to the eNB 1320 as well as to the correspondent UE 1340 and radio resources and control signaling for D2D communication are separate from radio resources and control signaling for wideband mobile communication at an RRC level. When needed, the D2D RRC layer 1310*b* and the mobile-communication RRC layer 1310*c* of the UE 1310 may invoke the NAS layer 1310*a* independently and process control messages directed to the network.

When radio resources for D2D communication are allocated, the D2D RRC layer 1310*b* of the UE 1310 is placed in a D2D RRC-Connected state. If D2D communication is not conducted or not available, the D2D RRC layer 1310*b* is placed in a D2D RRC-IDLE state. The state of the D2D RRC layer 1310*b* is independent of the state of the mobile-communication RRC layer 1310*c*. That is, D2D communication is separate from mobile communication and in spite of generation of a D2D control message directed to the network, it does not affect the state of the mobile-communication RRC layer 1310*c*.

On the other hand, upon receipt of a request for a network connection related to one of D2D communication and wideband mobile communication from the D2D RRC layer 1310b or the mobile-communication RRC layer 1310c, the NAS layer 1310a transitions to an ECM-Connected state and communicates with the D2D RRC layer 1310b or the mobile-communication RRC layer 1310c.

Figure 14:
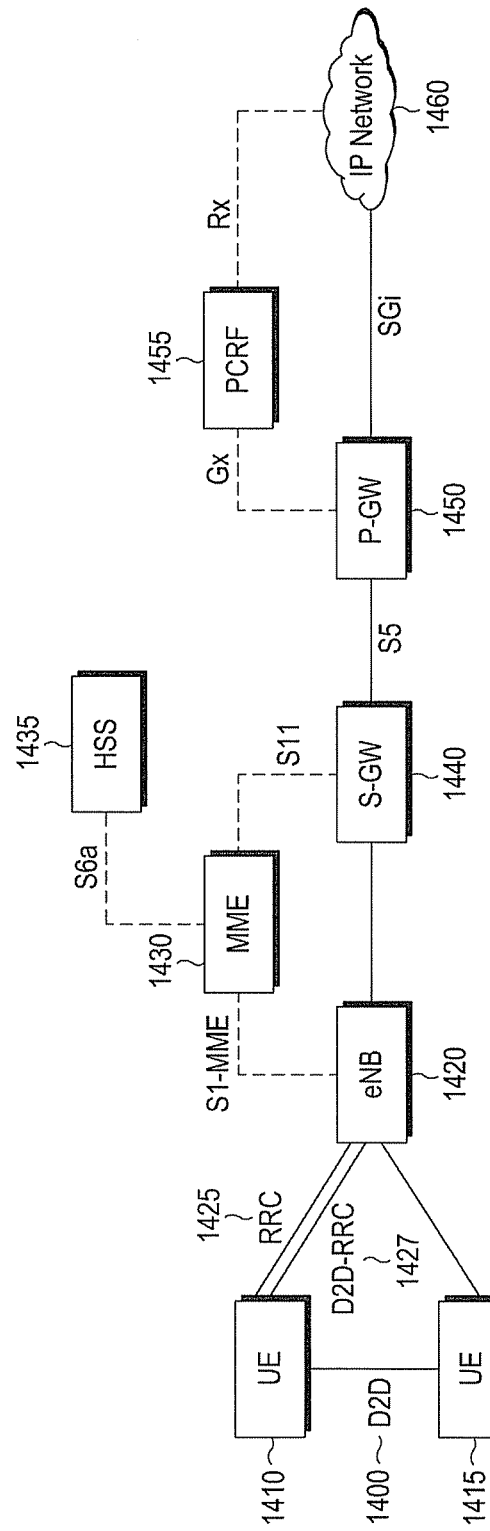
FIG. 14 illustrates a network reference model for a communication system supporting D2D communication according to the third embodiment of the present disclosure.

FIG. 14 illustrates a network reference model for a communication system supporting D2D communication according to the third embodiment of the present disclosure.

Referring to FIG. 14, the communication system includes UEs 1410 and 1415, at least one eNB 1420 that establishes radio bearers, an MME 1430 that manages the mobility of the UEs 1410 and 1415 and has a D2D control function, an S-GW 1440 that connects the UEs 1410 and 1415 to an external network, a P-GW 1450 that connects the S-GW 1440 to an IP network 1460 such as an IMS, an HSS 1435 that manages subscriber profiles of the UEs 1410 and 1415 and provides the subscriber profiles to the MME 1430, and a PCRF 1455 between the P-GW 1450 and the IP network 1460, which generates and manages a PCC rule for a mobile communication service.

The UEs 1410 and 1415 are D2D devices equipped with a D2D function. The UEs 1410 and 1415 also have functions for wideband mobile communication and may connect to the same eNB 1420 or different eNBs. The eNB 1420 manages and controls radio resources within its cell. Specifically, the eNB 1420 controls radio bearers, accepts a radio request, and performs functions such as dynamic radio resource management, load balancing, and inter-cell interference control. The MME 1430 is a network entity supporting the mobility of the UEs 1410 and 1415, which supports functions such as handover and paging and performs functions such as authentication, security key management, and roaming for the UEs 1410 and 1415 in conjunction with the HSS 1435. To perform these functions, the MME 1430 may exchange NAS signals with the UEs 1410 and 1415.

The S-GW 1440 distributes data to the eNB 1420 managed by the S-GW 1440 and serves as an anchoring point for handover between eNBs. The P-GW 1450 supports connectivity between the UEs 1410 and 1415 and an external network and provides a packet filtering function. Further, the P-GW 1450 allocates IP addresses to the UEs 1410 and 1415 and charges the UEs 1410 and 1415 for communication services based on a PCC rule provided by the PCRF 1455.

To attach to the eNB 1420, the UE 1410 uses two interfaces. That is, the UE 1410 is connected to the eNB 1420 via an LTE-Uu interface, that is, an RRC connection 1425 for wideband mobile communication. In contrast, the UE 1410 is connected to the eNB 1420 via a D2D interface, that is, a D2D RRC connection 1427 for D2D communication. The UE 1410 may also use a D2D interface to establish a D2D connection 1400 with another UE 1415. The D2D interface may be independent of the mobile-communication interface and used to conduct D2D communication between UEs and deliver D2D control messages to the network. At an RRC level, a network connection may not be related to a D2D connection and D2D radio resources may be allocated independently of a mobile communication network.

The eNB 1420 is connected to the MME 1430 via an S1-MME interface and uses an S1-AP protocol on the S1-MME interface. Upon receipt of a D2D control message directed to the MME 1430 from the UE 1410 or upon generation of a D2D control message in the eNB 1420, the eNB 1420 transmits the control message to the MME 1430 via the same S1-MME interface as used for mobile communication. Upon receipt of a D2D control message from the MME 1430 via the S1-MME interface, the eNB 1420 transmits the D2D control message to the UE 1410 via the D2D RRC connection 1427. In this manner, the D2D RRC connection 1427 and the RRC connection 1425 are independently established between the UE 1410 and the eNB 1420.

The MME 1430 is connected to the HSS 1435 via an S6a interface and receives subscriber information and security information required to support D2D communication from the HSS 1435 via the S6a interface.

Figure 15:
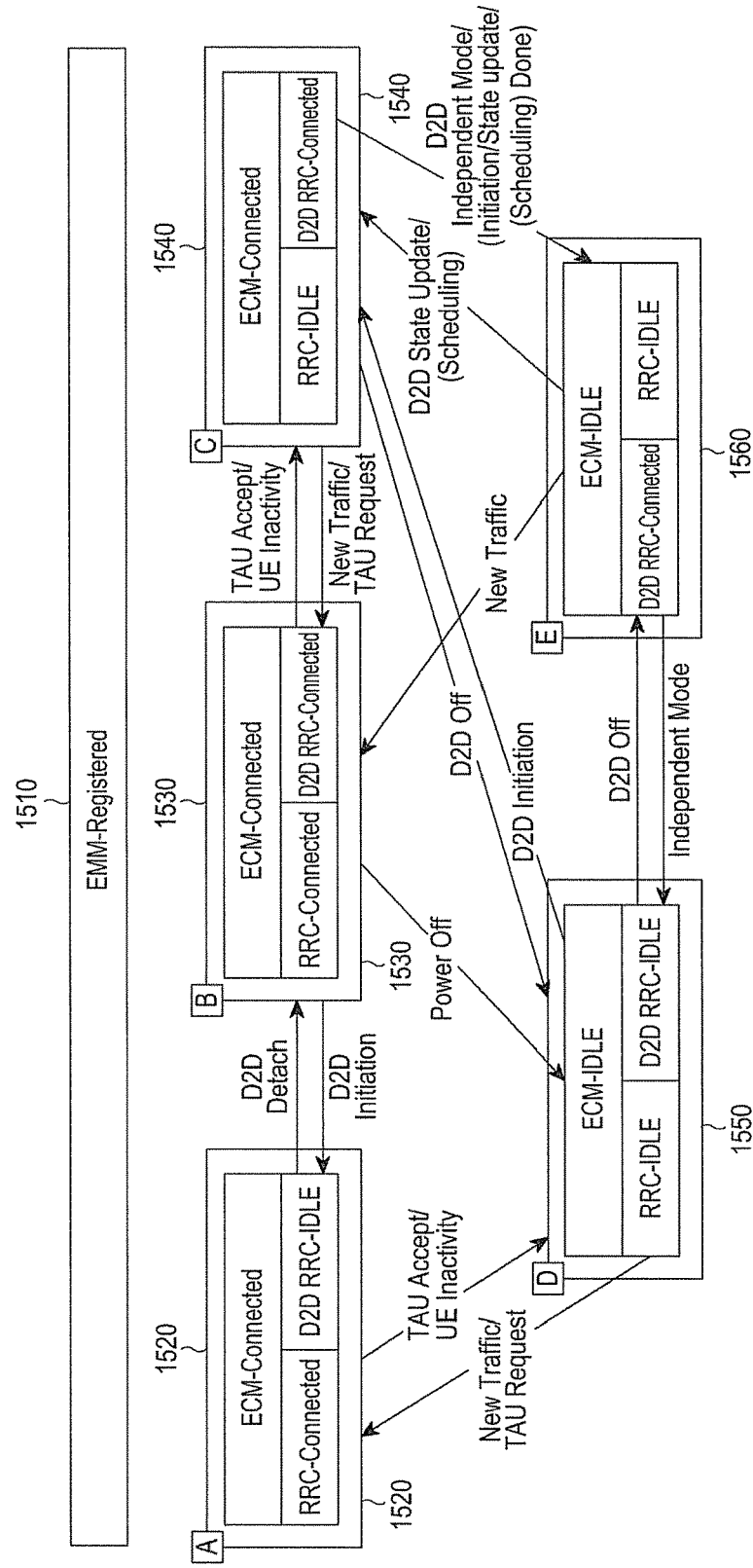
FIG. 15 illustrates state transitions of a UE to support D2D communication according to the third embodiment of the present disclosure.

FIG. 15 illustrates state transitions of a UE to support D2D communication according to the third embodiment of the present disclosure. While the following description is given mainly of a state transition operation of a UE, it is to be understood that the state transition of the UE takes place by a common algorithm in the UE, an eNB, and an MME. That is, when the UE transitions from one state to another state, the eNB and the MME manage the state of the UE in the same manner as the UE. Since D2D communication is not available in an EMM-Deregistered state of a NAS layer where the UE is not connected to the network, only an EMM-Registered state 1510 will be described below.

Referring to FIG. 15, the EMM-Registered state 1510 includes an A state 1520 defined by ECM-Connected, RRC-Connected, and D2D RRC-IDLE, a B state 1530 defined by ECM-Connected, RRC-Connected, and D2D RRC-Connected, a C state 1540 defined by ECM-Connected, RRC-IDLE, and D2D RRC-Connected, a D state 1550 defined by ECM-IDLE, RRC-IDLE, and D2D RRC-IDLE, and an E state 1560 defined by ECM-IDLE, RRC-IDLE, and D2D RRC-Connected.

The states of each layer are summarized in the following Table 3.

TABLE 3

| Layer | State | State Description |
|---|---|---|
| EMM | Registered | The UE is connected to the network and the MME knows the location of the UE. An IP address for S5 has been allocated to the UE. |
| | De-registered | The UE is not connected to the network and the MME knows only the last TA location of the UE. |
| ECM | Connected | A radio bearer for signaling/data and network resources of S1 have been allocated to the UE. |
| | IDLE | A radio bearer for signaling/data and network resources of S1 have not been allocated to the UE. |
| RRC | Connected | RRC connection setup is completed and thus the UE can request an SRB. |
| | IDLE | An RRC connection has not been established. |
| D2D RRC | Connected | D2D operation has been authenticated, all operations related to D2D communication are available, and D2D radio resources can be requested. |
| | IDLE | D2D operation is impossible. |

As described above, a Connected state and an IDLE state are available to a D2D RRC connection. In the D2D RRC-Connected state, a D2D registration procedure has been completed and thus radio resources are allocated for D2D communication. In the D2D RRC-Connected state, all D2D functions are available, such as synchronization between UEs, UE discovery, data transmission between UEs, and the like. In the D2D RRC-Connected state, a D2D operation may be performed independently of the network depending on whether an ECM connection is in the Connected state. A D2D RRC-IDLE state refers to a state in which a D2D operation is impossible. The D2D RRC-IDLE state includes power-off and a D2D IDLE state. Radio resources are not allocated for D2D communication in the D2D RRC-IDLE state. In the D2D RRC-IDLE state, the UE monitors a D2D state periodically. Upon generation of a D2D state change, the UE transitions to the Connected state and attempts a D2D state update to the network.

Now, state transition conditions for a UE will be described below.

In the EMM-Deregistered state, that is, in the state where the UE is not connected to a wideband communication system, upon request of attachment to a cellular mobile communication network, the UE may transition to the A state 1520.

The A state 1520 refers to a state where the UE has completed initial attachment to the network and registered to the network, and service use has been activated. In the A state 1520, the UE may transmit a control message and data to the network. That is, in the A state 1520, the UE has been allocated resources for wideband mobile communication and an S1 interface. Thus the UE may communicate with the MME, when needed.

If UE inactivity occurs or an ECM/RRC connection is released in the A state 1520, the UE transitions to the D state 1550. In the D state 1550, resources have not been allocated to the ECM connection on the control plane and resources have not been allocated to the remaining bearers except for an S5 bearer on the user plane. Upon receipt of a request for D2D initiation to initiate D2D communication in the A or D state 1520 or 1550, the UE transitions to the B or C state 1530 or 1540 and performs a D2D initiation procedure.

Control messages are transmitted to the network via a D2D RRC connection and an ECM connection independent of mobile communication in the D2D initiation procedure. Accordingly, upon receipt of a request for D2D initiation in the D state 1550 defined by ECM-IDLE, the UE transitions to the C state 1540, switches the D2D RRC connection to the Connected state, acquires radio resources for D2D communication, and switches the ECM connection to the Connected state using the radio resources, thereby completing the D2D initiation.

While not shown, D2D initiation may be performed in the EMM-Deregistered state, that is, in the state where the UE is not connected to the wideband mobile communication network. In this case, the D2D initiation procedure is included in an attach procedure for mobile communication or performed independently. After completing the D2D initiation, the UE may enter the B state 1530 or the C state 1540.

The C state 1540 refers to a state where the ECM connection for wideband mobile communication is active by the D2D RRC connection. Therefore, the mobile-communication RRC connection is in the IDLE state in the C state 1540. In the C state 1540, D2D functions (for example, discovery, data transmission, and the like) are normally executed and D2D control messages may be delivered to the network via the ECM connection activated by the D2D RRC connection. Thus, a security key update and control messages such as charging information that may be generated for D2D communication may be transmitted to the network without an additional attach procedure in the C state 1540.

Because the mobile-communication RRC connection is in the IDLE state in the C state 1540, the UE performs RRC-IDLE-state operations, for example, paging monitoring, TAU, and the like in the C state 1540. If TAU is required in the C state 1540, the UE transitions to the B state 1530, performs the TAU, and then returns to the C state 1540. Meanwhile, the ECM connection is in the Connected state in the C state 1540. Thus, the MME preserves a UE context supported by the NAS protocol. If the D2D function is turned off in the C state 1540, the UE releases both the ECM connection and the D2D RRC connection and transitions to the D state 1550.

The E state 1560 is used for the D2D independent mode, for PPDR or an emergency call. In the D2D independent mode, the UE may conduct D2D communication without control, admission, or authentication of the mobile communication network. For example, only a specific D2D UE, for example, a UE registered to a rescue center may receive a D2D signal from the independent-mode UE. If independent-mode D2D communication is requested in the D state 1550 or the C state 1540, the UE transitions to the E state 1560. If the D2D function is turned off in the E state 1560, the UE transitions to the D state 1550.

If the independent-mode D2D communication is requested in the D state 1560, the UE transitions to the E state 1560, switches the D2D RRC connection to the Connected state by accessing a preset wideband frequency by an independent initiation procedure without the need for the initiation procedure of the wideband mobile communication system, and performs an independent operation for D2D communication. In another embodiment of the present disclosure, the UE may receive a command regarding a D2D independent-mode operation from the network in the C state 1540 and transition to the E state 1560. That is, when the UE determines that the ECM connection need not be maintained any longer or receives an admission for the D2D independent mode from the wideband mobile communication network (particularly, the MME) in the event of a specific situation such as PPDR in the C state 1540, the UE may release the ECM connection and transition to the E state 1560.

In the E state 1560, the UE has been deactivated and the ECM/RRC connection has been released. Thus resources have not been allocated to the ECM connection on the control plane and resources have not been allocated to the remaining bearers except for an S5 bearer on the user plane. However, the UE may use the D2D function normally in the E state 1560. For D2D communication, the UE uses security information and/or a D2D user context received in advance from the network or stored in the UE.

If a D2D state update is needed due to expiration of a D2D security key of the UE or generation of updated charging information to be transmitted to the network in the E state 1560, the UE transitions to the C state 1540, activates the ECM connection to the Connected state, while maintaining the D2D RRC connection in the Connected state, and performs a necessary operation, that is, the D2D state update via the ECM connection. After the D2D state update is completed in the C state 1540, the UE returns to the E state 1560. If the eNB is configured to allocate resources for D2D discovery of the UE by D2D scheduling, the UE may transition from the E state 1560 to the C state 1540, receive a resource schedule for D2D discovery from the eNB, and upon completion of the scheduling, return to the E state 1560.

If D2D initiation is requested in the A state 1520 where the ECM connection and RRC connection for wideband mobile communication are in the Connected state, the UE transitions to the B state 1530, switches the D2D RRC connection to the Connected state, is allocated radio resources for D2D communication, and performs the D2D initiation procedure. Because the ECM connection is already in the Connected state in the A state 1520, there is no need for a new procedure related to an ECM state to transition to the B state 1530. That is, an S1 bearer used for wideband mobile communication is still maintained.

The B state 1530 refers to a state where the UE has completed the D2D initiation procedure with the wideband mobile communication system and registered to the network and service use has been activated. The UE may transmit a control message and data to the network and transmit a D2D control message and D2D data to a correspondent UE in the B state 1530. In the B state 1530, the UE has radio resources allocated for D2D communication and wideband mobile communication and has an S1 interface as well. Thus the UE may communicate with the MME, when needed.

If a deactivation condition such as the absence of uplink/downlink traffic for mobile communication for a predetermined time period is satisfied during D2D communication in the B state 1530, the UE transitions to the C state 1540. In the C state 1540, the mobile-communication RRC connection is in the IDLE state. If TAU is required due to expiration of a TAU timer, the UE transitions to the B state 1530 and performs the TAU. Upon completion of the TAU procedure, the UE returns to the C state 1540. Upon paging from the network or generation of uplink data in the C state 1540, the UE transitions to the B state 1530.

If UE inactivity occurs or the ECM/RRC connection is released due to a turning-off of the D2D function in the C state 1540, the UE transitions to the D state 1550.

If the UE determines not to use either of mobile communication and D2D communication in the B state 1530, the C state 1540, or the E state 1560, the UE is detached from the network and transitions to the D state 1550. If the network rejects D2D attachment for a special reason in the D2D initiation procedure in the A state 1520 or the D state 1550, the UE transitions to the previous A state 1520 or D state 1550.

Figure 16:
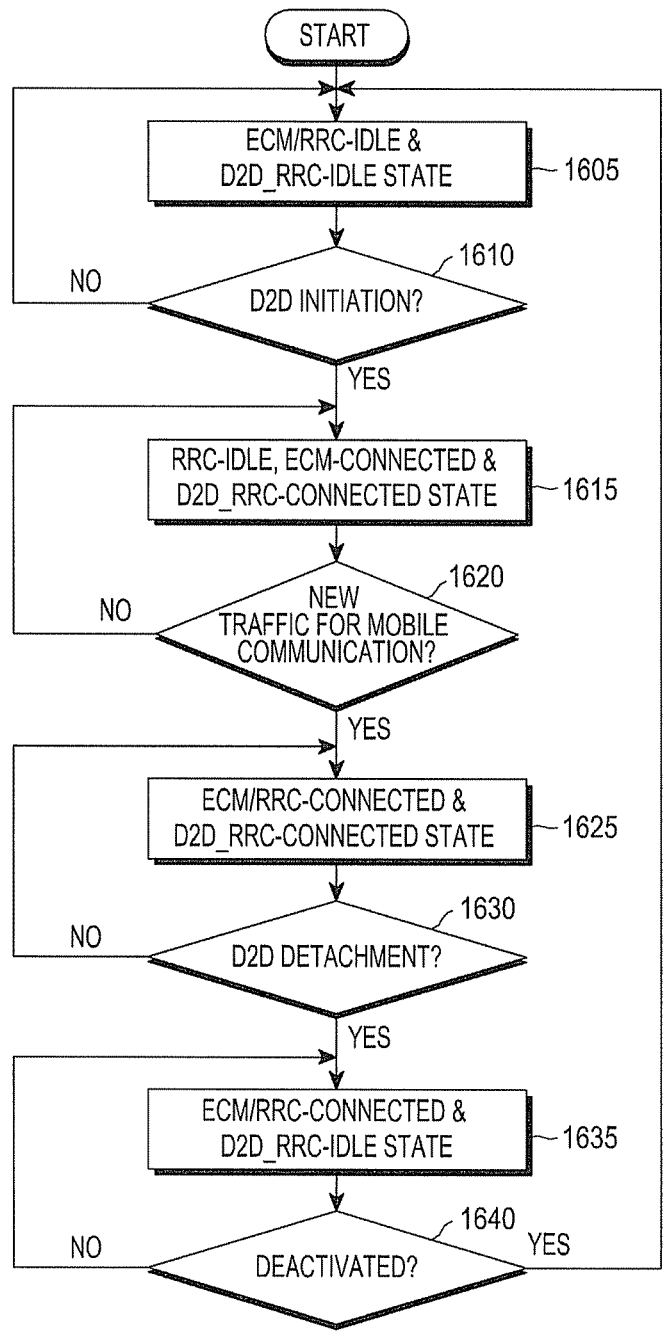
FIG. 16 is a flowchart illustrating a state transition operation of a UE according to the third embodiment of the present disclosure.

FIG. 16 is a flowchart illustrating a state transition operation of a UE according to the third embodiment of the present disclosure. An exemplary state transition flow related to D2D communication in the EMM-Registered state is shown in FIG. 16.

Referring to FIG. 16, the UE operates in the D state defined by ECM-IDLE, RRC-IDLE, and D2D RRC-IDLE in operation 1605. In operation 1610, the UE determines whether D2D initiation is required. In an embodiment of the present disclosure, upon execution of an application for D2D communication by a user, the UE may determine to perform the D2D initiation. If the D2D initiation is not required, the UE stays in the D state at operation 1605. On the other hand, if the D2D initiation is required in the D state, the UE transitions to the C state by switching a D2D RRC connection to the Connected state and switching an ECM connection to the Connected state by the D2D RRC connection, while maintaining an RRC connection in the IDLE state in operation 1615. The UE performs the D2D initiation through the D2D RRC connection and the ECM connection in the C state and upon completion of the D2D initiation, the UE may exchange information or data with a correspondent UE by D2D communication in the C state.

In operation 1620, the UE determines whether there is new traffic to be transmitted by mobile communication in the C state. In the presence of the new traffic, the UE transitions to the B state by switching the RRC connection to the Connected state and attaches to a mobile communication network, for transmission of the new traffic through the RRC connection and the ECM connection in operation 1625.

In operation 1630, the UE determines whether D2D detachment has been sensed in the B state. If the UE wants to complete D2D communication and perform D2D detachment, the UE transitions to the A state by switching the D2D RRC connection to the IDLE state, while maintaining the ECM/RRC connection in the Connected state in operation 1635.

In operation 1640, the UE determines in the A state whether a preset deactivation condition such as the absence of uplink and/or downlink traffic for a predetermined time period is satisfied. If the deactivation condition is satisfied, the UE transitions to the D state in operation 1605.

Figure 17:
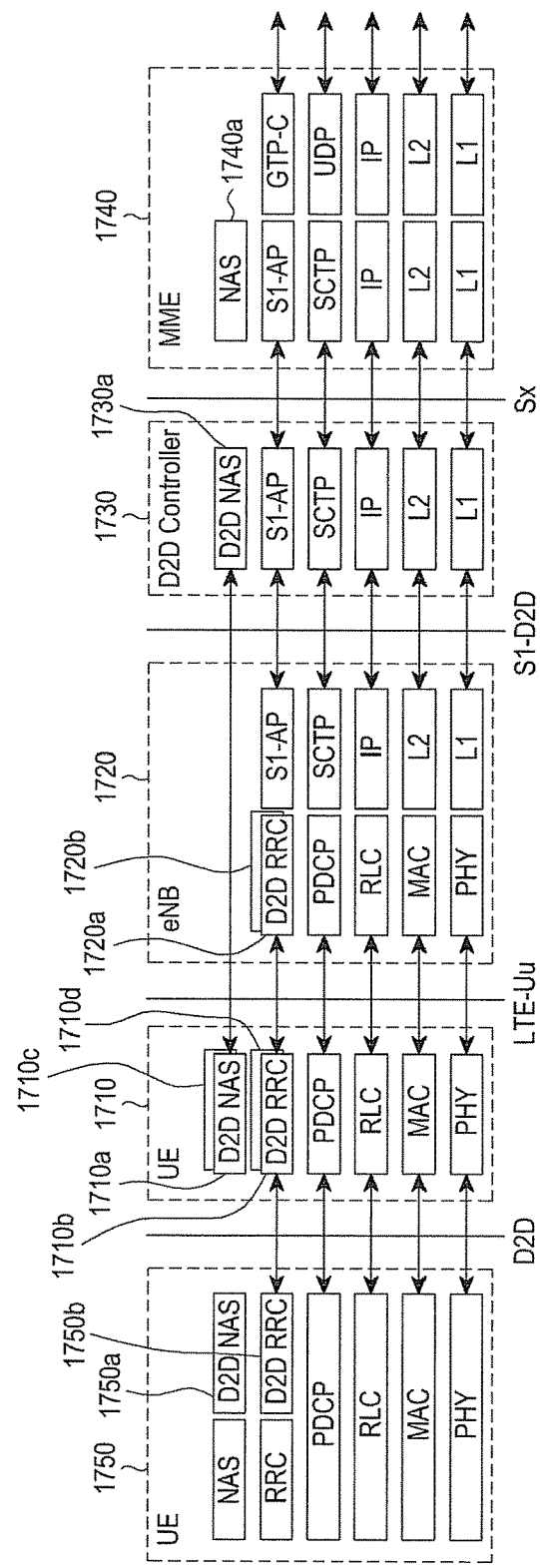
FIG. 17 illustrates protocol stacks to support D2D communication according to a fourth embodiment of the present disclosure.

FIG. 17 illustrates protocol stacks to support D2D communication according to a fourth embodiment of the present disclosure.

Referring to FIG. 17, a UE 1710 includes a mobile-communication RRC layer 1710*d*, a mobile-communication NAS layer 1710*c*, a D2D RRC layer 1710*b*, a D2D NAS layer 1710*a*, a PDCP layer, an RLC layer, a MAC layer, and a PHY layer. As illustrated in FIG. 17, the UE 1710 includes the D2D RRC layer 1710*b* and the D2D NAS layer 1710*a*, which may operate independently of the mobile-communication RRC layer 1710*d* and the mobile-communication NAS layer 1710*c*. An eNB 1720 includes a D2D RRC layer 1720*a* and a mobile-communication RRC layer 1720*b* as the counterparts of the D2D RRC layer 1710*b* and the mobile-communication RRC layer 1710*d* of the UE 1710.

The D2D RRC layer 1710*b* of the UE 1710 exchanges D2D control signals with the D2D RRC layer 1720*a* of the eNB 1720 and with a D2D RRC layer 1750*b* of a correspondent UE 1750. The mobile-communication RRC layer 1710*d* of the UE 1710 establishes a mobile-communication RRC connection and corresponds to the mobile-communication RRC layer 1720*b* of the eNB 1720.

For network-level control, the UE 1710 includes the mobile-communication NAS layer 1710*c* and the D2D NAS layer 1710*a*. The mobile-communication NAS layer 1710*c* transmits network-level control signals to a NAS layer 1740*a* of an MME 1740. The D2D NAS layer 1710*a* processes network-level D2D control signals by communicating with a D2D NAS layer 1730*a* of a D2D controller 1730. While the D2D controller 1730 is shown as an entity separately configured from the MME 1740, the D2D controller 1730 may be incorporated in the MME 1740 in another embodiment of the present disclosure. In this case, the D2D controller 1730 may share protocol layers of the MME 1740 (for example, S1-AP, SCTP, IP, L2, L1, and the like).

As described above, a D2D RRC protocol is extended from the UE 1710 to the eNB 1720 and a D2D NAS protocol is extended from the UE 1710 to the D2D controller 1730 (the MME 1740 in another embodiment), as well.

When radio resources for D2D communication are allocated, the D2D RRC layer 1710*b* of the UE 1710 is placed in a D2D_RRC-Connected state. If D2D communication is not used or D2D communication is not available, the D2D RRC layer 1710*b* of the UE 1710 is placed in a D2D_RRC-IDLE state. The D2D_RRC-Connected state of the D2D RRC layer 1710*b* means a D2D_RRC-Enable state, and the D2D_RRC-IDLE state of the D2D RRC layer 1710 means a D2D_RRC-Disable state. The state of the D2D RRC layer 1710*b* is independent of the state of the mobile-communication RRC layer 1710*d*.

Upon generation of a D2D control message directed to the network, the D2D NAS layer 1710*a* of the UE 1710 transitions to a D2D_ECM-Connected state and processes the D2D control message. If the D2D NAS layer 1710*a* is deactivated, the D2D NAS layer 1710*a* transitions to a D2D_ECM-IDLE state. The D2D_ECM-Connected state of the D2D NAS layer 1710*a* means a D2D_ECM-Enable state, and the D2D_ECM-IDLE state of the D2D NAS layer 1710*a* means a D2D_ECM-Disable state. The state of the D2D NAS layer 1710*a* is independent of the state of the mobile-communication NAS layer 1710*c*. That is, the RRC and NAS layers 1710a to 1710d for D2D communication and wideband mobile communication have perfectly independent states and protocols in the UE 1710.

Figure 18:
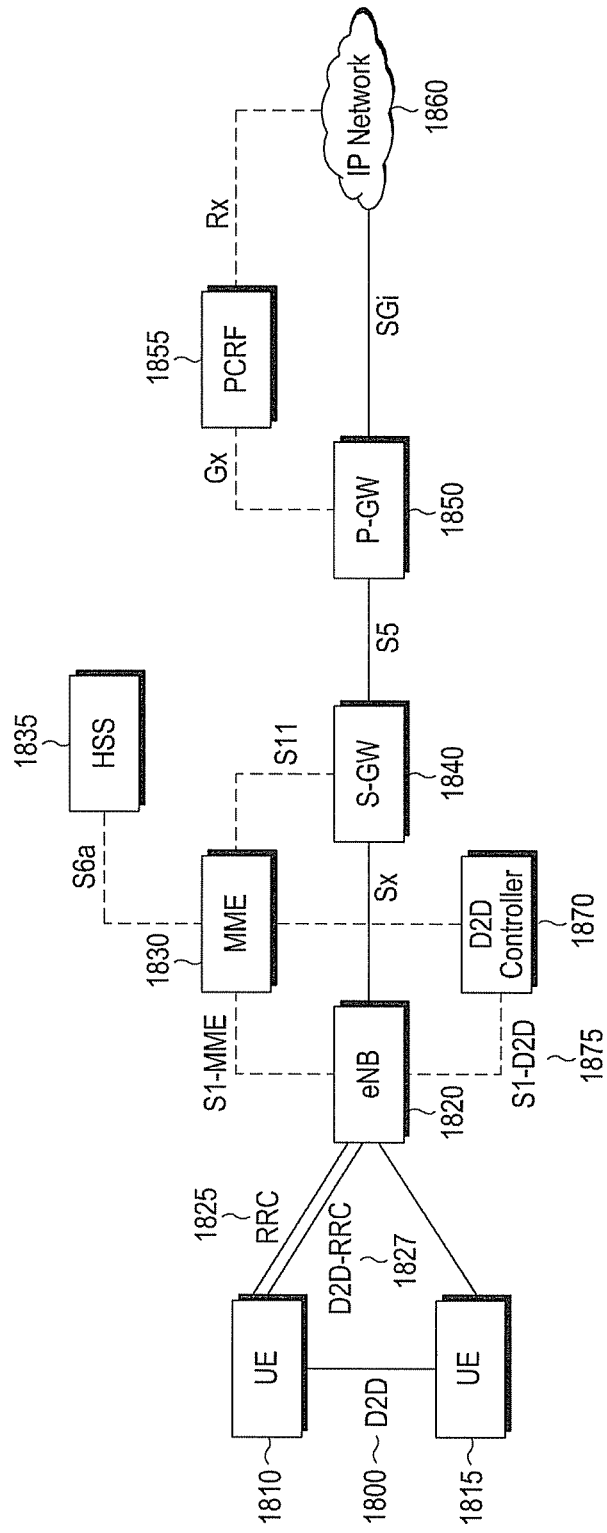
FIG. 18 illustrates a network reference model for a communication system supporting D2D communication according to the fourth embodiment of the present disclosure.

FIG. 18 illustrates a network reference model for a communication system supporting D2D communication according to the fourth embodiment of the present disclosure.

Referring to FIG. 18, the communication system includes UEs 1810 and 1815, at least one eNB 1820 that establishes radio bearers, an MME 1830 that manages the mobility of the UEs 1810 and 1815, a D2D controller 1870 for controlling D2D communication of the UEs 1810 and 1815, an S-GW 1840 that connects the UEs 1810 and 1815 to an external network, a P-GW 1850 that connects the S-GW 1840 to an IP network 1860 such as an IMS, an HSS 1835 that manages subscriber profiles of the UEs 1810 and 1815 and provides the subscriber profiles to the MME 1830, and a PCRF 1855 between the P-GW 1850 and the IP network 1860, which generates and manages a PCC rule for a mobile communication service.

The UEs 1810 and 1815 are D2D devices equipped with a D2D function. The UEs 1810 and 1815 also have functions for wideband mobile communication and may connect to the same eNB 1820 or different eNBs. The eNB 1820 manages and controls radio resources within its cell. Specifically, the eNB 1820 controls radio bearers, accepts a radio request, and performs functions such as dynamic radio resource management, load balancing, and inter-cell interference control. The MME 1830 is a network entity supporting the mobility of the UEs 1810 and 1815, which supports functions such as handover and paging and performs functions such as authentication, security key management, and roaming for the UEs 1810 and 1815 in conjunction with the HSS 1835. To perform these functions, the MME 1830 may exchange NAS signals with the UEs 1810 and 1815.

The S-GW 1840 distributes data to the eNB 1820 managed by the S-GW 1840 and serves as an anchoring point for handover between eNBs. The P-GW 1850 supports connectivity between the UEs 1810 and 1815 and an external network and provides a packet filtering function. Further, the P-GW 1850 allocates IP addresses to the UEs 1810 and 1815 and charges the UEs 1810 and 1815 for communication services based on the PCC rule provided by the PCRF 1855.

Functions of the D2D controller 1870 are largely divided into a provisioning function and a matching function. With the provisioning function, the D2D controller 1870 stores a D2D service policy set by a system operator, acknowledges a D2D communication function for the UEs 1810 and 1815, authorizes the UEs 1810 and 1815, and additionally provides charging control to the UEs 1810 and 1815. With the matching function, the D2D controller 1870 supports discovery of another UE available for D2D communication or search for intended information. The D2D controller 1870 is connected to the eNB 1820 via an S1 interface 1875. This is called an S1-D2D interface.

A D2D NAS connection is established between the UE 1810 and the D2D controller 1870 via a D2D RRC connection 1827 and the S1-D2D interface 1875. The D2D controller 1870 uses an Sx interface to connect to the MME 1830 of a wideband mobile communication network. Via the Sx interface, the D2D controller 1870 may acquire user information and mobility information about the UEs 1810 and 1815 from the HSS 1835 through the MME 1830. The D2D controller 1870 may be configured as a physical independent entity or a logical entity embedded into another network entity.

If the UE 1810 wants to initiate D2D communication, the UE 1810 uses two interfaces to attach to the eNB 1820. That is, for wideband mobile communication, the UE 1810 attaches to the eNB 1820 via an LTE-Uu interface, that is, an RRC connection 1825. For D2D communication, the UE 1810 attaches to the eNB 1820 via a D2D interface, that is, using the D2D RRC protocol 1827. The D2D interface may also be used to establish a D2D connection 1800 between the UE 1810 and the UE 1815. That is, the D2D interface is independent of the mobile-communication interface and may be used for D2D communication between UEs and delivery of D2D control messages directed to the network. A network connection may not be related to a D2D connection at an RRC level, and D2D radio resources may be allocated independently of the mobile communication network.

The eNB 1820 is connected to the MME 1830 via an S1-MME interface and uses an S1-AP protocol on the S1-MME interface. Further, the eNB 1820 is connected to the D2D controller 1870 via the S1-D2D interface 1875 to support D2D communication of the UEs 1810 and 1815. Upon receipt of a network-level D2D control message from the UE 1810 or upon generation of a D2D control message in the eNB 1820, the eNB 1820 transmits the D2D control message to the D2D controller 1870 via the S1-D2D interface 1875. In this manner, the eNB 1820 supports D2D communication using the D2D RRC connection 1827, independently of the mobile-communication RRC connection 1825 through which radio resources for wideband mobile communication are controlled.

The MME 1830 is connected to the HSS 1835 via an S6a interface, receives subscriber information and security information required to support D2D communication from the HSS 1835 via the S6a interface, and transmits the subscriber information and security information to the D2D controller 1870.

Figure 19:
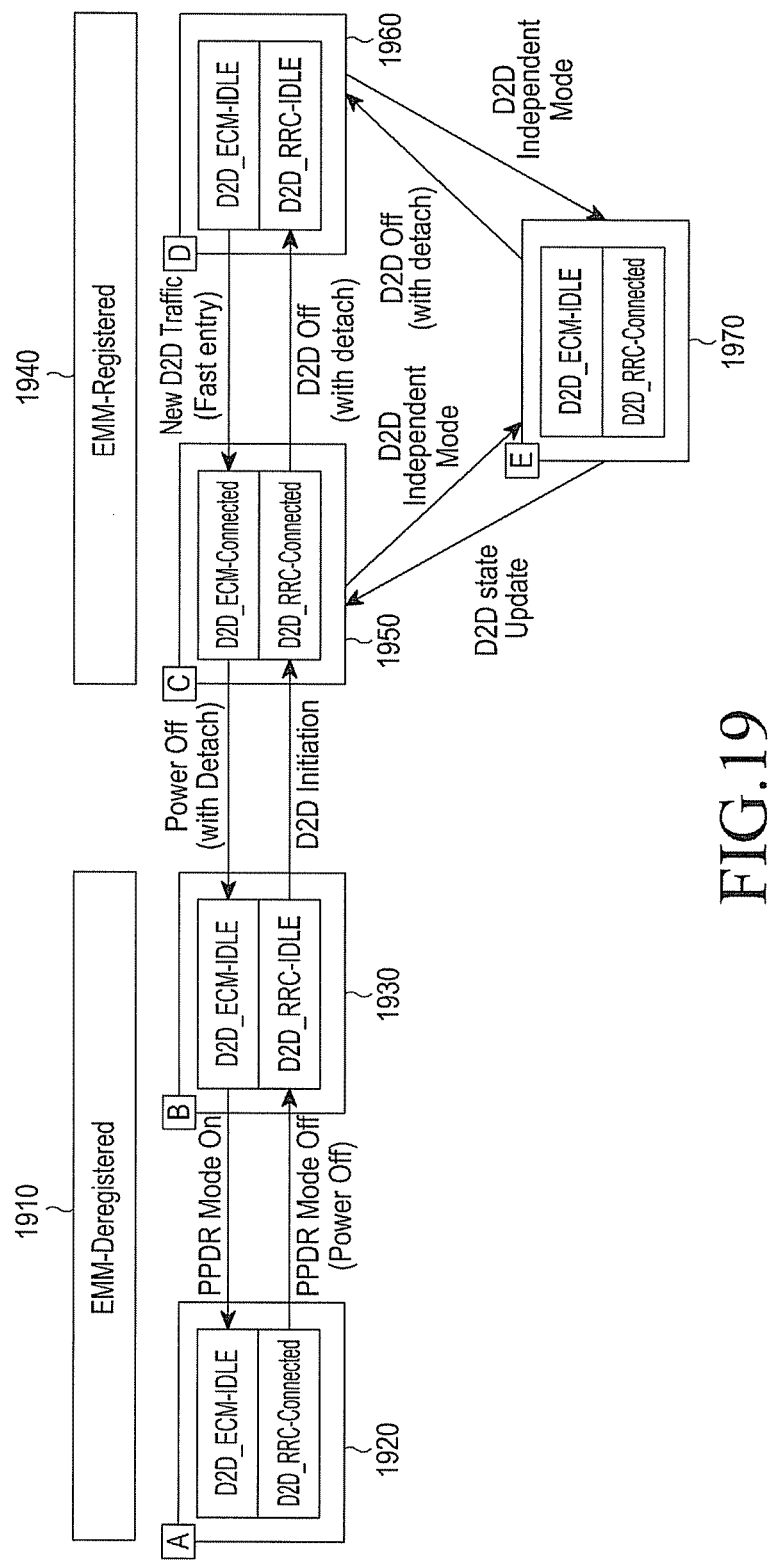
FIG. 19 illustrates state transitions of a UE to support D2D communication according to the fourth embodiment of the present disclosure.

FIG. 19 illustrates state transitions of a UE to support D2D communication according to the fourth embodiment of the present disclosure. While the following description is given mainly of a state transition operation of a UE, it is to be understood that the state transition of the UE takes place by a common algorithm in the UE, an eNB, and an MME. That is, when the UE transitions from one state to another state, the eNB and the MME manage the state of the UE in the same manner as the UE. A D2D RRC layer and a D2D NAS layer have the following states independent of the states of a mobile-communication RRC and a mobile-communication NAS layer.

Referring to FIG. 19, an EMM-Deregistered state 1910 includes an A state 1920 defined by D2D_ECM-IDLE and D2D_RRC-Connected, and a B state 1930 defined by D2D_ECM-IDLE and D2D_RRC-IDLE. An EMM-Registered state 1940 includes a C state 1950 defined by D2D_ECM-Connected and D2D_RRC-Connected, a D state 1960 defined by D2D_ECM-IDLE and D2D_RRC-IDLE, and an E state 1970 defined by D2D_ECM-IDLE and D2D_RRC-Connected.

The states of each layer are summarized in the following Table 4.

TABLE 4

| Layer | State | State Description |
|---|---|---|
| EMM | Registered | The UE is connected to the network and the MME knows the location of the UE. An IP address for S5 has been allocated to the UE. |

TABLE 4-continued

| Layer | State | State Description |
|---|---|---|
| | De-registered | The UE is not connected to the network and the MME knows only the last TA location of the UE. |
| D2D ECM | Connected | Radio resources (SRB/DRB) for D2D control and S1-D2D network resources have been allocated to the UE. |
| | IDLE | Radio resources (SRB/DRB) for D2D control and S1-D2D network resources have not been allocated to the UE. |
| D2D RRC | Connected | Radio resources are available for D2D communication or radio resources have been allocated for D2D control. |
| | IDLE | Radio resources have not been allocated for D2D communication or a D2D operation is idle. |

As described above, a Connected state and an IDLE state are available to a D2D RRC connection. The D2D_RRC-Connected state refers to a state in which as a D2D registration procedure has been completed and radio resources are allocated for D2D communication. In the D2D_RRC-Connected state, all D2D functions are available, such as synchronization between UEs, UE discovery, data transmission between UEs, a mode change with mobile communication, and the like. In the D2D_RRC-Connected state, a D2D operation is possible independently of the network depending on whether an ECM connection is in the Connected state or IDLE state. The D2D_RRC-IDLE state refers to a state in which a D2D operation is impossible. The D2D_RRC-IDLE state includes power-off or a D2D-IDLE state. In the D2D_RRC-IDLE state, radio resources have not been allocated for D2D communication. The UE periodically monitors a D2D state in the D2D_RRC-IDLE state. Upon generation of a D2D state change, the UE transitions to the Connected state and attempts a state update to the network.

The Connected state and the IDLE state are available to a D2D ECM connection. The D2D_ECM-Connected state refers to a state where resources have been allocated to deliver a D2D control message to the network. In the D2D_ECM-Connected state, D2D supports initiation, security key update, D2D discovery information, charging, and the like which are available through the network. The D2D_ECM-IDLE state means that a D2D function is idle and the network does not preserve a context for supporting the D2D function in the D2D_ECM-IDLE state.

Now, state transition conditions for a UE will be described below.

Since the D2D RRC connection and the ECM connection of the UE are idle in the B state 1930, a D2D function is not or cannot be used in the B state 1930. However, if a PPDR mode in which the D2D function is used irrespective of connection to the wideband system is activated in a special situation in the B state 1930, the UE connects to a preset wideband frequency by an independent attach procedure without attaching to the wideband system, switches the D2D RRC connection to the Connected state, transitions to the A state 1920, and then performs an independent D2D operation. In the A state 1920, the UE may conduct D2D communication with another UE by a preset mechanical setting. If a predetermined condition such as a turn-off of the PPRDR mode, power-off, elapse of a predetermined time, expiration of a security key, and the like is satisfied in the A state 1920, the UE returns to the B state 1930.

If D2D communication is requested in the B state 1930, the UE transitions to the C state 1950 by a D2D initiation procedure. The C state 1950 refers to a state where the UE has completed the D2D initiation procedure and registered to the network and service use has been activated. The UE may transmit a D2D control message and D2D data to the network in the C state 1950. The C state 1950 is configured independently of wideband mobile communication. Thus, since the UE has radio resources allocated for D2D communication and has an S1 interface as well in the C state 1950, the UE may communicate with the MME and/or the D2D controller, when needed.

If the UE does not need to transmit data to the network any more, network communication is impossible, an independent-mode operation is acknowledged by the network, or the UE determines that an independent-mode operation is required in the C state 1950, the UE switches the D2D ECM connection to the IDLE state and transitions to the E state 1970.

If a deactivation condition, a condition that D2D traffic has not been generated for a predetermined time period, is satisfied in the C state 1950, the UE releases the ECM/RRC connection and transitions to the D state 1960. In the D state 1960, resources have not been allocated to the ECM connection on the control plane and resources have not been allocated to the remaining bearers except for an S5 bearer on the user plane. If the UE decides to resume the D2D function in the D state 1960, the UE returns to the C state 1950 by the D2D initiation procedure. In another embodiment of the present disclosure, the D2D controller stores D2D connection-related information about the UE for a predetermined time. Therefore, if the UE requests D2D initiation before the D2D connection-related information is deleted, a 'fast entry' procedure may be performed between the UE and the D2D controller based on the pre-stored information by omitting a part of the existing D2D initiation procedure.

If the D2D independent mode is requested in the D state 1960, the UE switches the D2D RRC connection to the Connected state by accessing a preset wideband frequency in an independent attach procedure without connecting to the wideband system, transitions to the E state 1970, and performs an independent-mode D2D operation. In the E state 1970, the UE may conduct D2D communication with another UE by a preset mechanical setting or a previous setting received from the network.

In the E state 1970, the D2D RRC connection is in the Connected state, whereas the D2D ECM connection is in the IDLE state. That is, the UE may not exchange information with the network. The UE conducts D2D communication in the independent mode using security information and/or a D2D user context received in advance from the network or pre-stored in the UE in the E state 1970.

If the UE determines not to use either the D2D network communication or D2D communication in the C state 1950, the UE transitions to the B state 1930 by detachment. If the network rejects attachment of the UE for a special reason during the D2D initiation in the C state 1950, the UE also transitions to the B state 1930.

If D2D communication has not be conducted for a predetermined time or the D2D function of the UE is turned off in the C state 1950, the UE transitions to the D state 1960.

The UE transitions from the D state 1960 to the C state 1950:
  upon generation of new traffic to be transmitted by D2D communication; or
  when an update is required due to expiration of a D2D security key, or a state report or state update to the network is required due to transmission of charging information.

Figure 20:
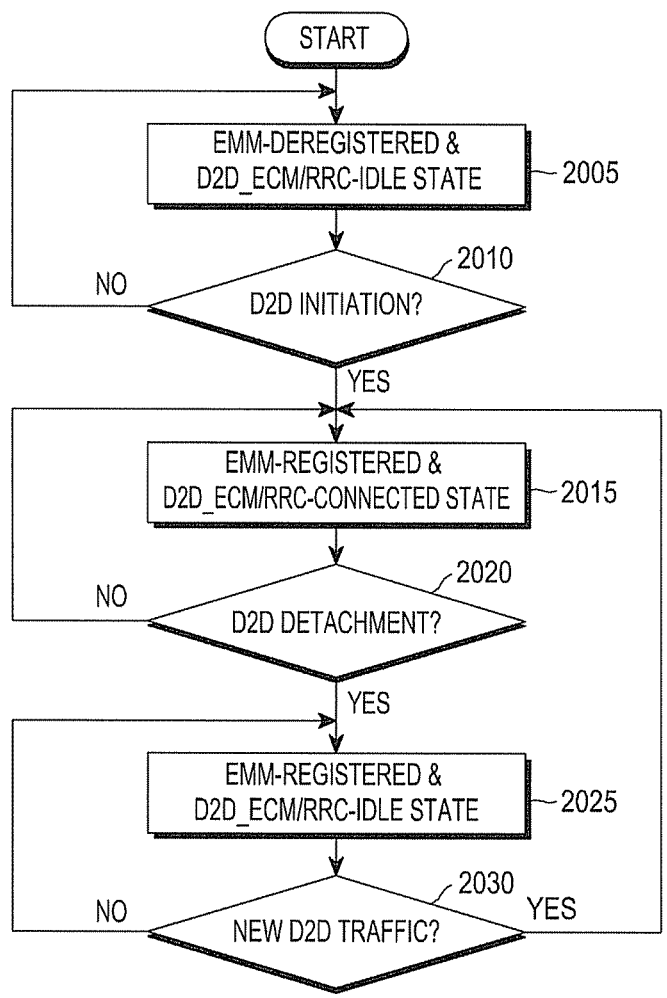
FIG. 20 is a flowchart illustrating a state transition operation of a UE according to the fourth embodiment of the present disclosure.

FIG. 20 is a flowchart illustrating a state transition operation of a UE according to the fourth embodiment of the present disclosure. An exemplary state transition flow related to D2D communication is shown in FIG. 20. A state transition related to D2D communication takes place independently of a state transition related to mobile communication.

Referring to FIG. 20, the UE operates in the B state defined by EMM-Deregistered and D2D_ECM/RRC-IDLE in operation 2005. In operation 2010, the UE determines whether D2D initiation is required. In an embodiment of the present disclosure, upon execution of an application for D2D communication by a user, the UE may decide to perform the D2D initiation. If the D2D initiation is not required, the UE stays in the B state. On the other hand, if the D2D initiation is required, the UE transitions to the C state defined by EMM-Registered and D2D_ECM/RRC-Connected and performs the D2D initiation in operation 2015.

In operation 2020, the UE determines whether D2D detachment is required in the C state. If D2D detachment is not required, the UE may maintain the C state. On the other hand, if D2D detachment is required, the UE transitions to the D state defined by EMM-Registered and D2D_ECM/RRC-IDLE in operation 2025. In another embodiment of the present disclosure, if a deactivation condition is satisfied, that is, D2D traffic has not been generated for a predetermined time in the C state, the UE may determine to transition to the D state.

In operation 2030, the UE determines whether new traffic has been generated, for transmission by D2D communication in the D state. Upon generation of the new D2D traffic, the UE returns to operation 2015 in order to transition to the C state. If a D2D user context related to the UE still remains in the D2D controller, the D2D initiation may be performed in a fast entry procedure by omitting a part of the existing D2D initiation procedure.

Figure 21:
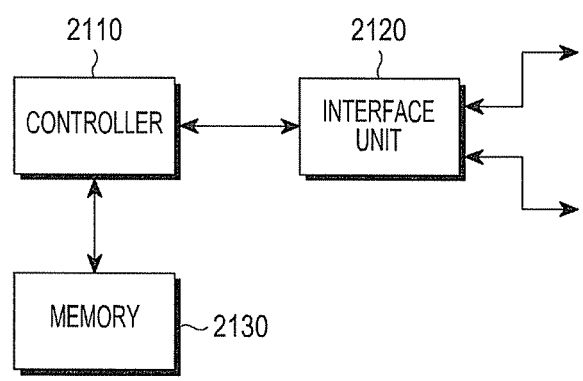
FIG. 21 is a block diagram of a network entity supporting state transitions of a UE in relation to D2D communication according to an embodiment of the present disclosure.

FIG. 21 is a block diagram of a network entity supporting state transitions of a UE in relation to D2D communication according to an embodiment of the present disclosure. The illustrated structure is applicable to any network entity related to state transitioning of a UE, such as an eNB, an MME, or a D2D controller.

Referring to FIG. 21, the network entity includes a controller 2110, an interface unit 2120, and a memory 2130. The interface unit 2120 supports communication with a corresponding entity, that is, a UE, an eNB, an MME, or the like, receives a control message or data from the corresponding entity, and transmits a control message or data to the corresponding entity.

The controller 2110 manages the states of a UE according to at least one of the afore-described, embodiments. If the network entity is an eNB, the controller 2110 switches and manages the hierarchical states of the UE upon occurrence of a transition event such as power-on of the UE, a D2D attach request, a D2D detach request, D2D detach rejection, a state update request, acknowledgment of a correspondent UE update, and the like. If the network entity is an MME, the controller 2110 switches and manages the hierarchical states of the UE, upon receipt or transmission of a NAS message, reporting of a UE event from an eNB, and the like.

The memory 2130 stores data, parameters, a UE context, security information, and the like required for operations of the controller 2110 and provides the data, parameters, a UE context, security information, and the like to the controller 2110 when needed. In addition, the memory 2130 receives new data and information from the controller 2110 and updates existing data and information using the new data and information.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The invention claimed is:

1. A method for performing a state transition for device to device (D2D) communication, the method comprising;
    detecting that a D2D initiation is required, while a terminal is operating in a first or a second state, which are defined by an absence of a non-access stratum (NAS) signaling connection and an absence of a radio resource control (RRC) connection when the terminal has detached from a network, wherein a mobility management entity (MME) in the first state does not have information regarding to attachment of the terminal except for subscriber information of the terminal, and the MME in the second state preserves identification information of the terminal and security context allocated to the terminal during a previous network attachment;
    in response to the D2D initiation being required, transitioning from one of the first state and the second state to a third state defined by a presence of the NAS signaling connection and a presence of the RRC connection when the terminal has attached from the network and performing the D2D initiation through the network;
    in response to a deactivation condition being satisfied or a D2D state update being completed in the third state, transitioning to a fourth state when the terminal has attached from the network, wherein the fourth state is defined by the absence of the NAS signaling connection and the absence of the RRC connection; and
    in response to a state update or scheduling for D2D communication being required in the fourth state, transitioning to the third state.

2. The method of claim 1, wherein the terminal includes a NAS layer and an RRC layer that process control messages related to cellular communication and D2D communication.

3. The method of claim 1, further comprising:
    in response to the terminal being detached from a network, or D2D initiation being rejected, a radio link failure occurring, or the terminal being powered off in the third state, transitioning to the second state.

4. The method of claim 1, further comprising:
    in response to a new traffic signal to be transmitted occurring or a track area update being required in the fourth state, transitioning to the third state.

5. A method for performing a state transition for device to device (D2D) communication, the method comprising;
    detecting a D2D initiation is required, while a terminal is operating in a first or a second state which are disabled the D2D communication when the terminal has attached from a network, wherein the first state is defined by a presence of a non-access stratum (NAS) signaling connection layer and a presence of radio resource control (RRC), and the second state is defined by an absence of the NAS signaling connection layer and an absence of the RRC;
    in response to the D2D initiation being required, transitioning from one of the first state and the second state to a third state to be enabled the D2D communication when the terminal has attached from a network, wherein the third state is defined by the presence of the NAS signaling connection layer and the presence of the RRC, and performing the D2D initiation through a network;

in response to a deactivation condition being satisfied or a D2D state update being completed in the third state, transitioning to a fourth state to be enabled the D2D communication when the terminal has attached from a network, wherein the fourth state is defined by the absence of the NAS signaling connection layer and the absence of the RRC; and in response to a state update or scheduling for D2D communication being required in the fourth state, transitioning to the third state.

6. The method of claim 5, wherein the terminal includes a non-access stratum (NAS) layer for cellular communication, an RRC layer for cellular communication, and a D2D RRC layer configured to transmit and receive control messages related to D2D communication to and from a correspondent terminal.

7. The method of claim 5, further comprising:
in response to D2D detachment occurring or D2D initiation being rejected in the third state, transitioning to the first state; and
in response to a D2D function being turned off in the third state, transitioning to the second state.

8. The method of claim 5, wherein the first state is defined by EPS (enhanced packet system) mobility management (EMM)-deregistered and EPS connection management (ECM)-connected at a non-access stratum (NAS) layer and radio resource control (RRC)-connected, and the second state is defined by ECM-IDLE and RRC-IDLE.

9. The method of claim 5, further comprising:
in response to a new traffic signal to be transmitted occurring or a track area update being required in the fourth state, transitioning to the third state.

10. An apparatus in a terminal for performing a state transition for device to device (D2D) communication, the apparatus comprising;
a communication processor configured to perform functions of a non-access stratum (NAS) layer and a radio resource control (RRC) layer that processes control messages related to cellular communication and D2D communication; and
a controller configured to control states of the NAS layer and the RRC layer,
wherein the controller is further configured to:
determine whether a D2D initiation is required, while a terminal is operating in a first or a second state defined by EPS (enhanced packet system) mobility management (EMM)-deregistered and EPS connection management (ECM)-idle at a non-access stratum (NAS) layer and radio resource control (RRC)-idle;
in response to the D2D initiation being required, transition from one of the first state and the second state to a third state defined by EMM-registered, ECM-connected, and RRC-connected and performing the D2D initiation through a network;
in response to a deactivation condition being satisfied or a D2D state update being completed in the third state, transition to a fourth state defined by EMM-registered, ECM-idle, and RRC-idle; and
in response to a state update or scheduling for D2D communication being required in the fourth state, transition to the third state.

11. The apparatus of claim 10, wherein the terminal includes a NAS layer and an RRC layer that process control messages related to cellular communication and D2D communication.

12. The apparatus of claim 10, wherein the first state is defined by ECM-idle and RRC-idle, in which a mobility management entity does not have information regarding to attachment of the terminal except for subscriber information of the terminal, and
the second state is defined by ECM-idle and RRC-idle, in which the mobility management entity preserves identification information of the terminal and security context allocated to the terminal during a previous network attachment.

13. The apparatus of claim 10, wherein the controller is further configured to:
in response to the terminal being detached from a network, or D2D initiation being rejected, a radio link failure occurring, or the terminal being powered off in the third state, transition to the second state.

14. The apparatus of claim 10, wherein the controller is further configured to:
in response to a new traffic signal to be transmitted occurring or a track area update being required in the fourth state, transition to the third state.

15. An apparatus in a terminal for performing a state transition for device to device (D2D) communication, the apparatus comprising;
a communication processor configured to perform functions of a non-access stratum (NAS) layer and a radio resource control (RRC) layer that processes control messages related to cellular communication and D2D communication; and
a controller configured to control states of the NAS layer and the RRC layer,
wherein the controller is further configured to:
determine whether D2D initiation is required, while a terminal is operating in a first or a second state defined by D2D-Disable;
in response to the D2D initiation being required, transition from one of the first state and the second state to a third state defined by EPS (enhanced packet system) connection management (ECM)-connected, radio resource control (RRC)-connected and D2D-enable and performing the D2D initiation through a network;
in response to a deactivation condition being satisfied or a D2D state update being completed in the third state, transition to a fourth state defined by ECM idle, RRC-idle and D2D-enable; and
in response to a state update or scheduling for D2D communication being required in the fourth state, transition to the third state.

16. The apparatus of claim 15, wherein the terminal includes a non-access stratum (NAS) layer for cellular communication, an RRC layer for cellular communication, and a D2D RRC layer configured to transmit and receive control messages related to D2D communication to and from a correspondent terminal.

17. The apparatus of claim 15, wherein the controller is further configured to:
in response to D2D detachment occurs or D2D initiation being rejected in the third state, transition to the first state; and
in response to a D2D function being turned off in the third state, transition to the second state.

18. The apparatus of claim 15, wherein the first state is defined by EPS (enhanced packet System) mobility management (EMM)-deregistered and EPS connection management (ECM)-connected at a non-access stratum (NAS) layer and radio resource control (RRC)-connected, and the second state is defined by ECM-idle and RRC-idle.

19. The apparatus of claim 15, wherein the controller is further configured to:
   in response to a new traffic signal to be transmitted occurring or a track area update being required in the fourth state, transitioning to the third state.

* * * * *